(12) United States Patent
Karpenko et al.

(10) Patent No.: US 10,560,628 B2
(45) Date of Patent: Feb. 11, 2020

(54) ELIMINATION OF DISTORTION IN 360-DEGREE VIDEO PLAYBACK

(71) Applicant: Magenta Labs, Inc., San Francisco, CA (US)

(72) Inventors: Alexandre Karpenko, San Francisco, CA (US); Christopher Cunningham, Redwood City, CA (US); Jonathan Denby, San Francisco, CA (US)

(73) Assignee: Visual Supply Company, Oakland, CA (US)

( * ) Notice: Subject to any disclaimer, the term of this patent is extended or adjusted under 35 U.S.C. 154(b) by 0 days.

(21) Appl. No.: 15/913,264

(22) Filed: Mar. 6, 2018

(65) Prior Publication Data

US 2019/0130539 A1     May 2, 2019

Related U.S. Application Data

(60) Provisional application No. 62/578,726, filed on Oct. 30, 2017.

(51) Int. Cl.
| | |
|---|---|
| *H04N 5/232* | (2006.01) |
| *G06F 3/0484* | (2013.01) |
| *G06F 3/0488* | (2013.01) |
| *G11B 27/34* | (2006.01) |
| *H04N 13/189* | (2018.01) |

(Continued)

(52) U.S. Cl.
CPC ....... *H04N 5/23238* (2013.01); *G06F 3/0488* (2013.01); *G06F 3/04842* (2013.01); *G06F 3/04883* (2013.01); *G06F 3/04886* (2013.01); *G06T 5/006* (2013.01); *G06T 15/10* (2013.01); *G11B 27/34* (2013.01); *H04N 5/23216* (2013.01); *H04N 13/117* (2018.05); *H04N 13/15* (2018.05); *H04N 13/189* (2018.05); *H04N 13/282* (2018.05); *G06T 2200/24* (2013.01); *G06T 2207/10021* (2013.01); *G06T 2207/20212* (2013.01)

(58) Field of Classification Search
CPC ... G06T 5/006; G06T 2200/24; G06F 3/0488; H04N 5/23238
USPC ........................................................ 386/280
See application file for complete search history.

(56) References Cited

U.S. PATENT DOCUMENTS

| | | |
|---|---|---|
| 10,346,704 B2 | 7/2019 | Kim et al. |
| 10,349,046 B2 | 7/2019 | Choi et al. |

(Continued)

OTHER PUBLICATIONS

"U.S. Appl. No. 15/913,150, Non Final Office Action dated Mar. 26, 2019", 11 pgs.

(Continued)

*Primary Examiner* — Loi H Tran
(74) *Attorney, Agent, or Firm* — Schwegman Lundberg & Woessner, P.A.

(57) ABSTRACT

In some implementations, a 360-degree camera includes two wide-angle lenses that provide a spherical view of a scene. The 360-degree camera is configured to be connected to a computing device (e.g., a smart phone) for rendering the captured images. In some implementations, the camera lenses in the 360-degree camera are wide-angle lenses (e.g., 208°) and corrections are performed to the projection of the 3D video data into a planar view to adjust the fisheye effect. A fisheye mapping function is selected that improves the distribution of sampling rays to present a natural view without blurred areas.

11 Claims, 20 Drawing Sheets

(51) Int. Cl.
  *H04N 13/15*   (2018.01)
  *H04N 13/117*  (2018.01)
  *H04N 13/282*  (2018.01)
  *G06T 5/00*    (2006.01)
  *G06T 15/10*   (2011.01)

(56) References Cited

U.S. PATENT DOCUMENTS

2006/0023105 A1*  2/2006  Kostrzewski ......... G06T 3/0018
                                              348/335
2015/0105123 A1   4/2015  Song et al.
2017/0094239 A1*  3/2017  Tsuchiya ................ H04N 5/217
2017/0195615 A1   7/2017  Han et al.
2017/0339469 A1  11/2017  Trikannad
2018/0146216 A1*  5/2018  Chang ................. H04L 65/4076
2019/0132511 A1   5/2019  Karpenko et al.
2019/0132569 A1   5/2019  Karpenko et al.

OTHER PUBLICATIONS

U.S. Appl. No. 15/913,150, filed Mar. 6, 2018, Image Processing for 360-Degree Camera.
U.S. Appl. No. 15/913,381, filed Mar. 6, 2018, Control of Viewing Angles for 360-Degree Video Playback.
"U.S. Appl. No. 15/913,150, Response filed Jul. 25, 2019 to Non-Final Office Action dated Mar. 26, 2019", 16 pgs.
"U.S. Appl. No. 15/913,381, Non Final Office Action dated Jul. 23, 2019", 12 pgs.

* cited by examiner

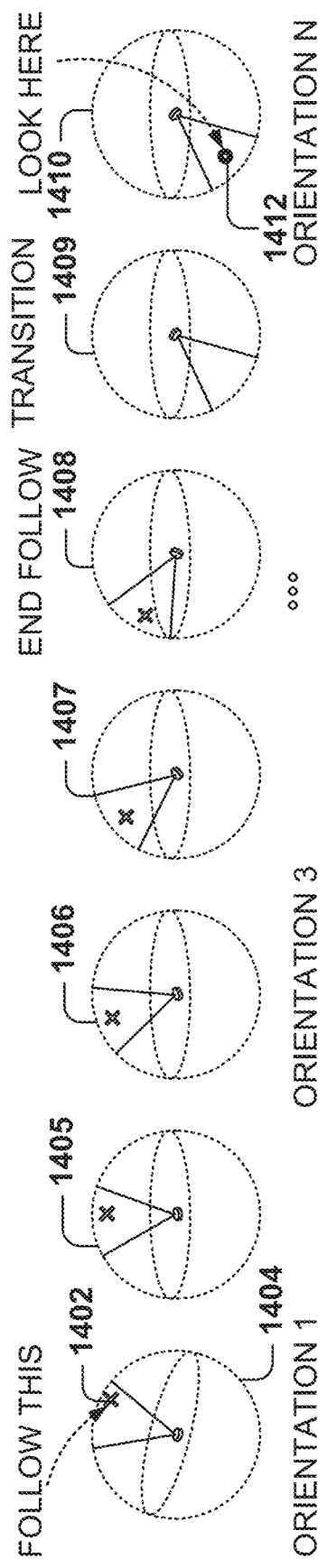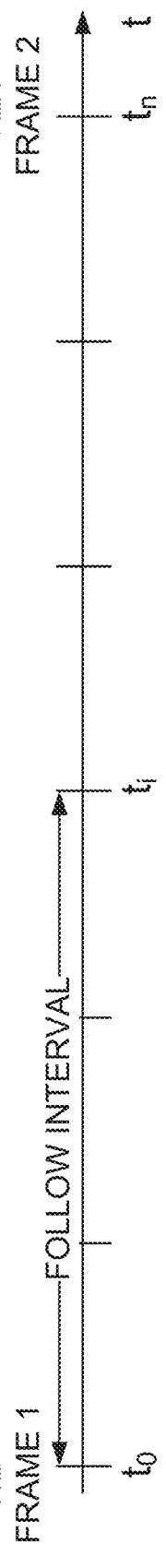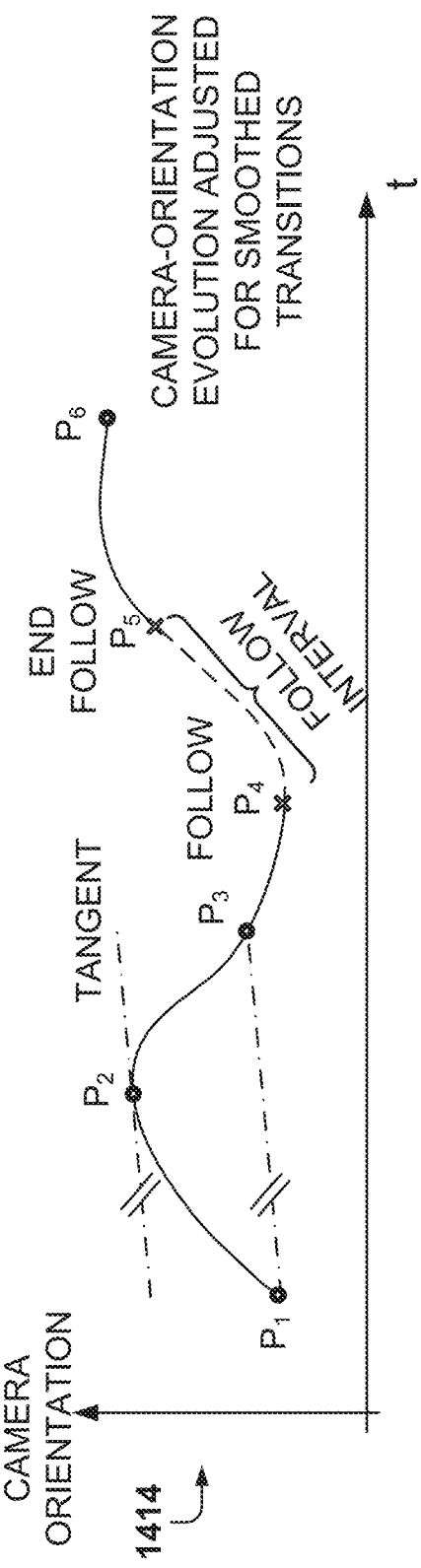
Fig. 14A
Fig. 14B

ELIMINATION OF DISTORTION IN 360-DEGREE VIDEO PLAYBACK

CLAIM OF PRIORITY

This application claims priority from U.S. Provisional Patent Application No. 62/578,726, filed Oct. 30, 2017, and entitled "Image Processing for 360 Degree Camera." This provisional application is herein incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, Magenta Labs Inc. All Rights Reserved.

TECHNICAL FIELD

The subject matter disclosed herein generally relates to methods, systems, and programs for displaying video captured with a 360-degree camera.

BACKGROUND

Devices with multiple cameras capture images surrounding a point in space to create a surround view around the point. The captured view, referred to as 360° view or spherical view, may then be presented on a display; however, a display is a flat surface and the 360° view has to be converted to a video that may be presented on the display, similar to the way other traditional videos are presented.

Some user interfaces provide the option of changing the orientation of what is shown on the display as the video plays. However, sometimes it may be difficult for the user to follow points of interest within the sphere, and the video shows instead parts of the view of low interest. For example, a race may be captured with the camera, but the orientation may be towards the people in the stands, instead of the action of the race in front of the stands. Users have the option to interactively change the view, but they have to manually change the view it every time and the resulting video may not be saved.

Further, the cameras used for capturing a surround view usually have a very wide angle, resulting in a fisheye effect. Correcting this fisheye effect may result in distorted views, such as the presence of blurred lines at the edges of the field of view of the lenses.

BRIEF DESCRIPTION OF THE DRAWINGS

Various ones of the appended drawings merely illustrate example embodiments of the present disclosure and cannot be considered as limiting its scope.

FIG. 14A is a time diagram showing the evolution of the orientation while tracking a landmark, according to some example embodiments.

FIG. 14B is a chart showing the creation of the smooth orientation transitions while playing the video, according to some example embodiments.

DETAILED DESCRIPTION

Figure 1A:
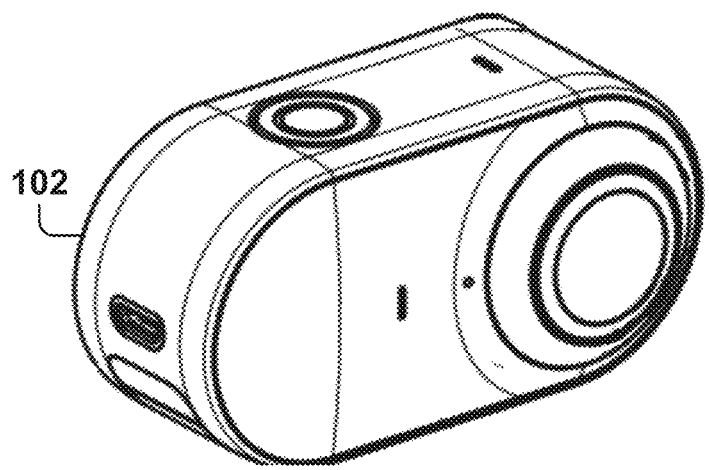
FIGS. 1A-1C show different views of the 360-degree camera, according to some example embodiments.

Example methods, systems, and computer programs are directed to providing a versatile user interface for viewing projections of 360-degree videos, the user interface allowing the user to simultaneously display multiple camera angles and to set camera orientation points that guide the playback of the video for smooth rendering. Additionally, methods are provided for eliminating distortion by controlling the fisheye effect resulting from using wide-angle lenses. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In some implementations, a 360-degree camera includes two wide-angle lenses that provide a spherical view of a scene. The 360-degree camera is configured to be connected to a computing device (e.g., a smart phone) for rendering the captured images. The user interface provides for the ability to present several camera views simultaneously, where each camera view is operated independently from the other camera views, such that the view may be changed during display by the user by changing the orientation. A plurality of rendering processes are executed in parallel to provide the data for each of the views and the output from each process is combined for presentation on the display. Additionally, a plurality of different combinations of multiple view layouts are provided, such as a circular view inside a rectangular view, a view that splits the display into equal separate views, three or four independent camera views displayed simultaneously, etc.

In some implementations, the user interface provides Options to set camera orientations during playback in order to present a selected orientation in the view while the video is displayed. Additionally, specific orientations may be set in some frames and the video processor provides for smooth transitions from the orientation in one frame to the orientation in the next specified frame. This way, the user may follow the action on a particular sequence during playback. In addition, the resulting video playback may be saved as a movie.

The user interface also provides the option to set user-defined landmarks and follow these landmarks, for a user-configured amount of time, during playback. This enables the video replay to show a particular item for a period of time, such as a cyclist driving by on the road or focusing on a particular monument while driving by on a moving vehicle.

In some implementations, the camera lenses in the 360-degree camera are wide-angle lenses (e.g., 208°) and corrections are performed to the projection of the 3D video data into a planar view to adjust the fisheye effect. A fisheye mapping function is selected that improves the distribution of sampling rays to present a natural view without blurred areas.

Figure 1B:
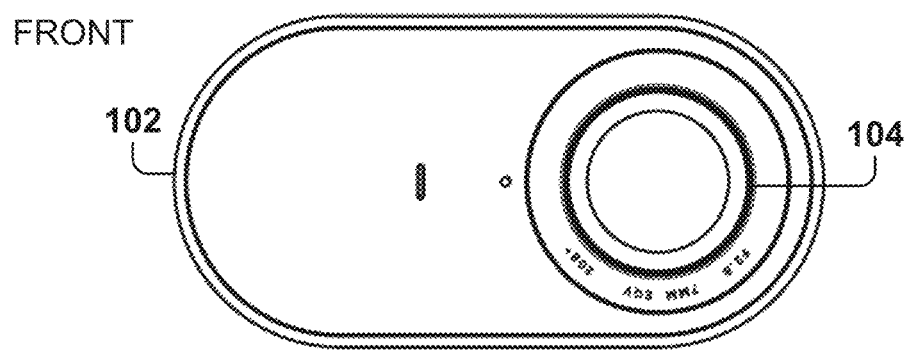
Figure 1C:
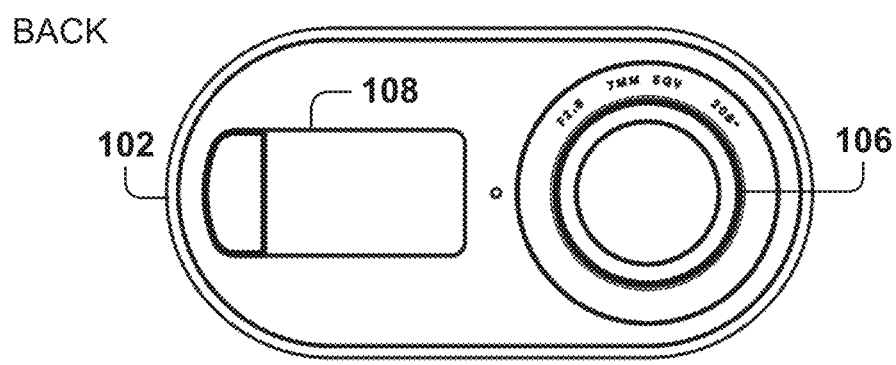

FIGS. 1A-1C show different views of the 360-degree camera, according to some example embodiments. FIG. 1A shows a 360-degree camera 102, and FIGS. 1B and 1C show the front and back views of the 360-degree camera 102. The 360-degree camera 102 includes a front lens 104 and a back lens 106 which are situated back-to-back, orientated in opposite directions.

The lenses are wide-angle lenses (e.g., 280°, although other values are also possible, such as values in the range from 180° to 225° or more). In some example embodiments, when the angle is greater than 180°, the images captured by the cameras overlap. In addition, the 360-degree camera 102 includes a display 108 and other camera elements, such as a shutter button, one or more connectors, and wired and wireless communication modules.

The 360-degree camera 102 includes stabilization and an easy-to-use application for execution on the computer device that allow the user to easily generate sophisticated videos with minimal configuration.

Figure 1D:
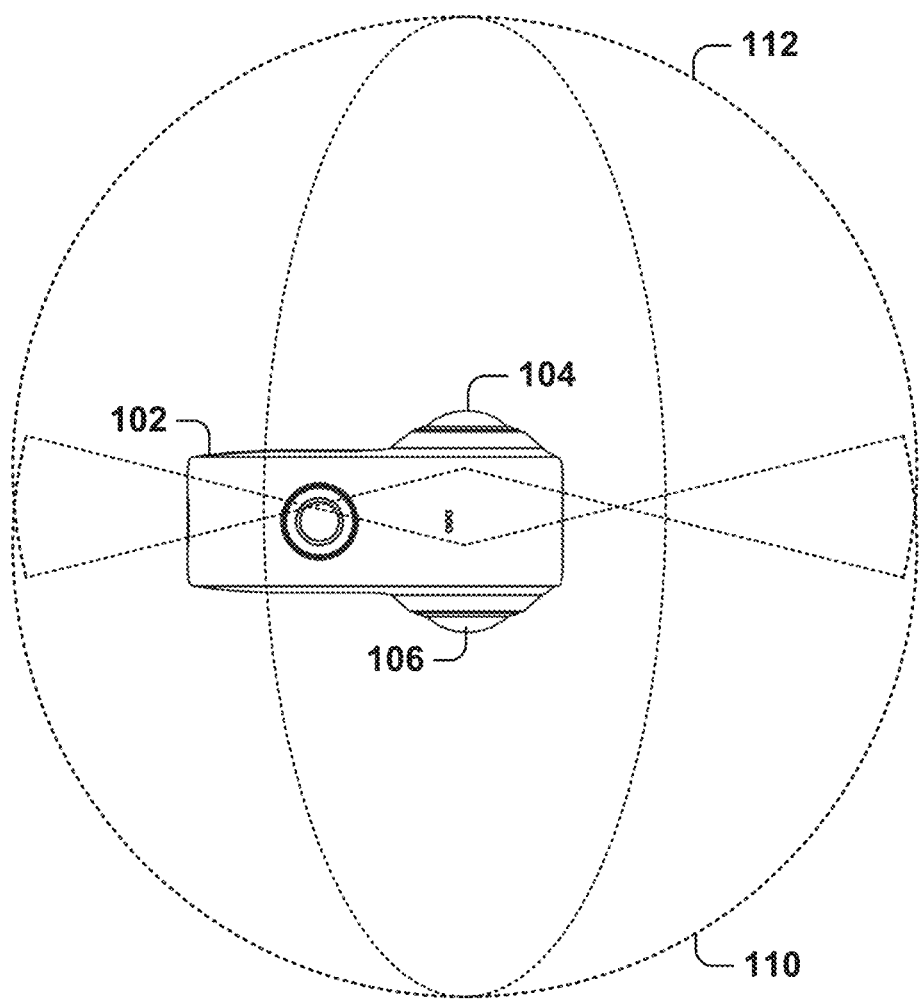
FIG. 1D illustrates the use of two lenses for capturing a spherical view, according to some example embodiments.

FIG. 1D illustrates the use of two lenses for capturing a spherical view, according to some example embodiments. FIG. 1D shows a top view of the 360-degree camera 102 with lenses 104 and 106 facing opposite directions. Lens 104 captures an area 112 in front of the camera and lens 106 captures the area behind the camera 110. It is noted that the concepts of front or back are used to refer to the location of the camera, which has a so-called a front lens and a rear lens, but since a whole sphere is mapped around the camera, any point can become the front or the back. Further, the camera may be moving and the image stabilized through video data processing, so what's in front of the camera or behind the camera may change constantly.

Since the camera angles are greater than 180°, a portion of the video data overlaps. In this case, stitching may be performed to blend the pixel data obtained by both cameras. Since the cameras may have slight variations due to the manufacturing process, the pixel data (e.g., RGB data) may show variations and blending of the two images is required to provide for smooth transitions, making the spherical view of the space surrounding the camera completely seamless so the user does not need to know exactly where the camera is really situated at any point in time. It is noted that the camera may be in motion during recording, but by using the stabilization process, the camera may appear still when rendering the video. In some example embodiments, the stabilization may be turned on or off by the user.

Figure 2:
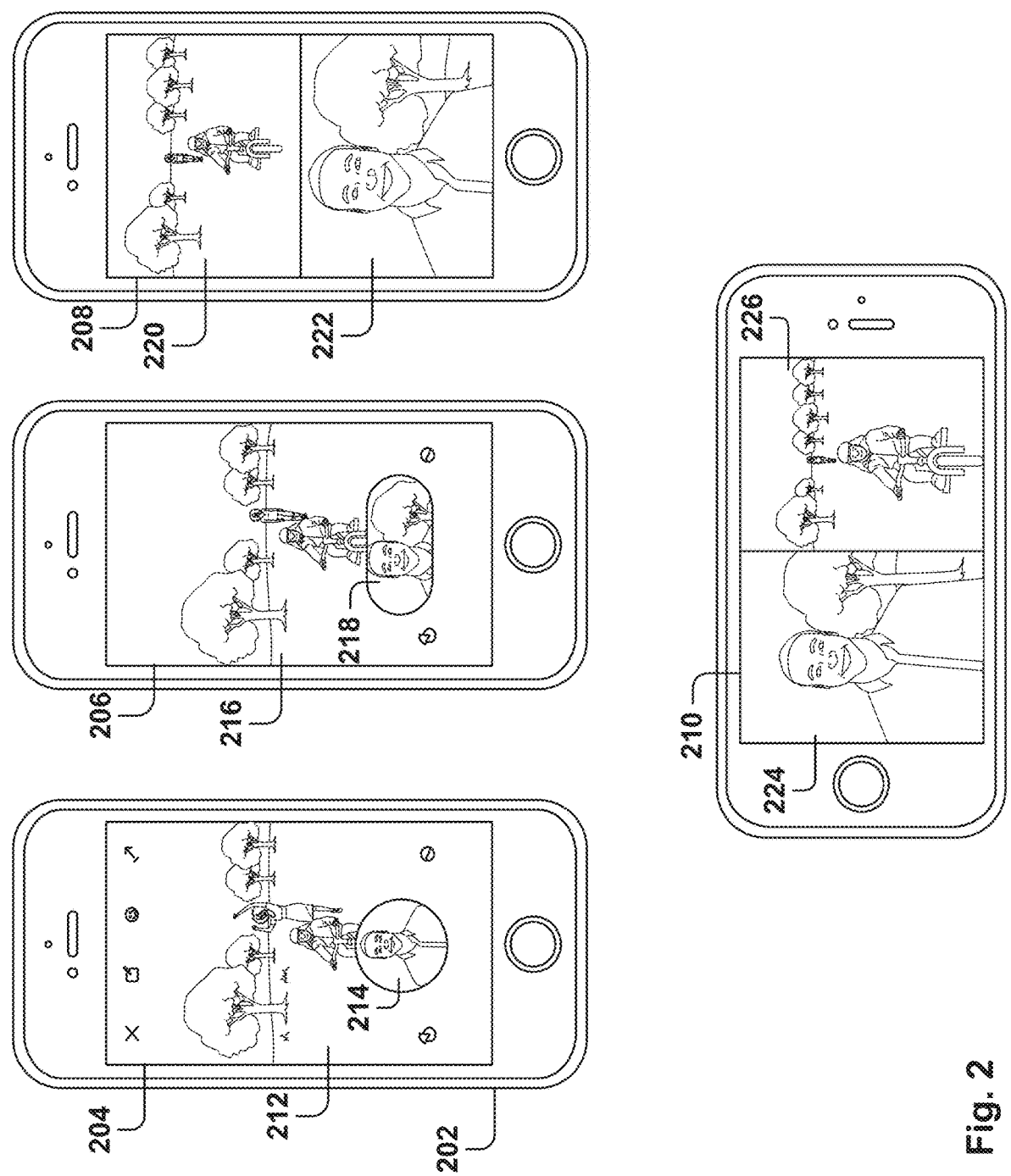
FIG. 2 illustrates a user interface for presenting multiple virtual views simultaneously, according to some example embodiments.

FIG. 2 illustrates a user interface for presenting multiple virtual views simultaneously, according to some example embodiments. The 360-degree camera 102 captures everything around the user and the content may be viewed with the swipe of the finger. The user may pan and rotate through a 360° video's perspective, to watch the images from different angles, by dragging the finger within a video to the right, left, up, down, or in any direction.

In some example embodiments, the user interface 204 provides an option for viewing multiple views simultaneously, an option also referred to herein as Front Back, although the views are not limited to the front and the back views.

The views may be considered as projections of the sphere onto respective planes, which are rendered on the display. Each virtual camera may have a separate and independent orientation from the other virtual cameras. As used herein, these cameras are referred to as virtual cameras that generate a view to be presented on a display, similar to the view that a regular camera would provide for rendering video.

The disposition of the multiple views within the display may take many forms. For example, user interface 204 shows a main view 212 with a secondary view 214 in the form of a circle embedded within the main view 212. User interface 206 also includes a main view 216 and a secondary view 218 in the shape of a rectangle with added semicircles at each end, similar to the shape of an Olympic track.

The user interface 208 includes two equal views, each view occupying half of the display. Other views may include more than two virtual cameras (e.g., three, four, eight, etc.) Further, the shape of display of any virtual view may be a square, a rectangle, a circle, a triangle, a star, a pentagon or any other shape, and any combination may be possible, such as utilizing two circles or four circles.

In addition, the views may also be adjusted for landscape view or portrait view. User interface 210 includes the split display for two virtual cameras 224 and 226 in landscape orientation.

In some example embodiments, the user interface provides a virtual button on the display to enable Front Back view. The default view is the screen split in two, but other default views are possible, such as the views illustrated in FIG. 2. After the initial view, the user may circle through other views by repeatedly tapping the same virtual button or going back to display one virtual view.

Each view is independent; therefore, the user may pan and change the orientation with her finger and the user may set up viewing options, such as the key frame options described below, to each of the virtual views. There may be the case, that the user moves the orientation of the virtual cameras, such that their views may overlap and part of the displays present the same pixel data for an area.

The 360-degree camera 102 includes directional microphones and, when presented a single view, the captured sound by the directional microphones is interpolated in order to emulate how the sound would be received by a microphone oriented in the direction of the virtual camera. Thus, each of the sound channels are associated with a sound vector indicating the direction of the microphone. The virtual view identifies a virtual view vector and the sound vector from the different channels are interpolated to generate the sound associated with the virtual view vector.

In some example embodiments, when utilizing multiple views simultaneously, the sound from all channels is combined in order to generate a mono playback. In other embodiments, when displaying two different views, the sound for each view is generated as if captured by the virtual camera, and then both sounds are mixed together for presentation in the mobile device 202.

The multiple views are useful in many scenarios to highlight multiple points of interest in the scene, such as a parent looking at a baby taking her first steps, an incident in the stands during a sports event, riding with the camera (e.g., on a bicycle or upon a car) and being able to see action at the front as well as on the side or back, a party with multiple groups of people, etc.

Figure 3:
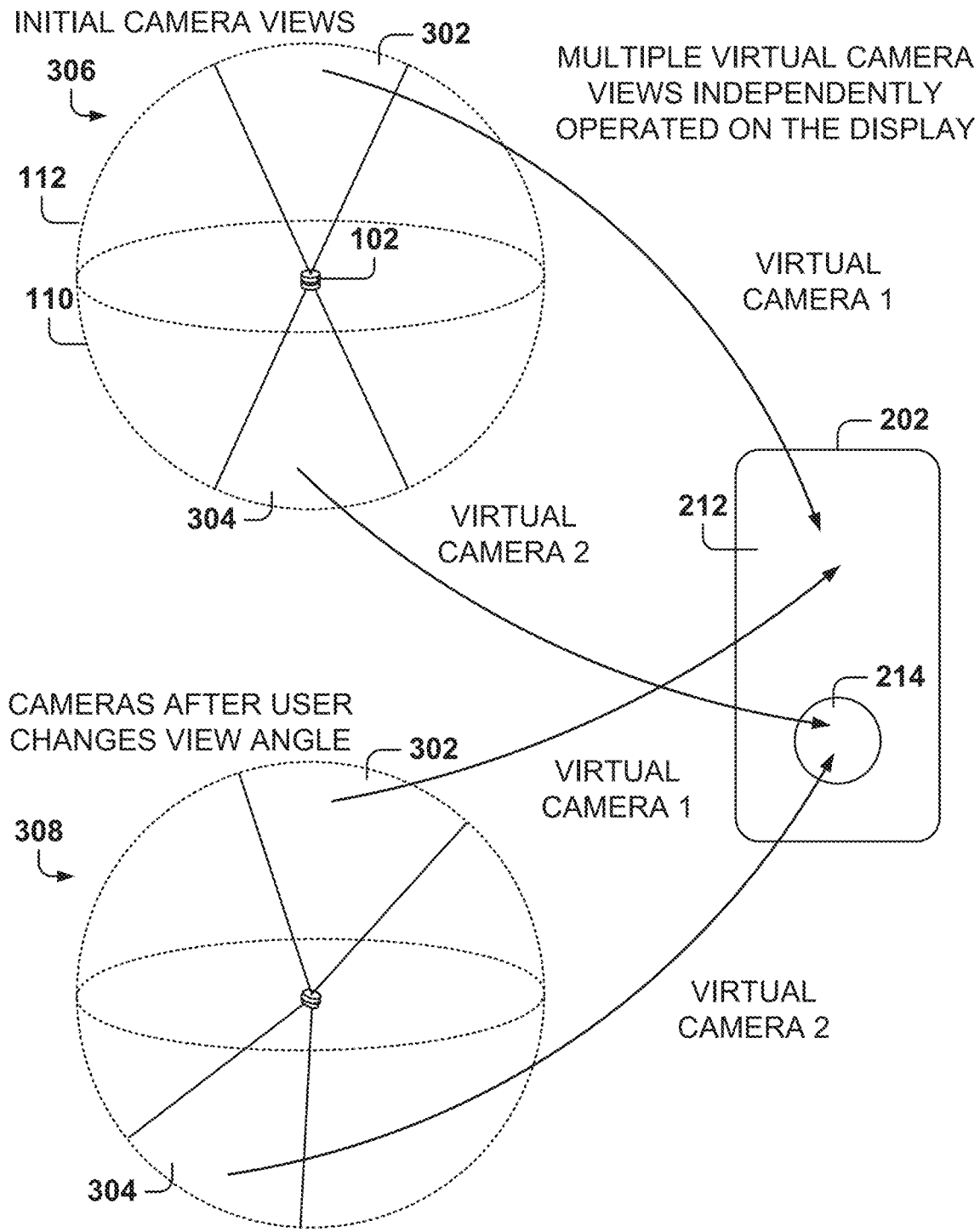
FIG. 3 illustrates the processing of the multiple virtual-camera views for presentation on the user interface, according to some example embodiments.

FIG. 3 illustrates the processing of the multiple virtual-camera views for presentation on the user interface, according to some example embodiments. The spherical view around the camera is composed by adding the views 110 and 112 from the front and rear lenses. Initially 306, a first view 302 is generated for presenting on the first area 212 of the display and a second view 304 is generated for presenting on the second area 214 of the display.

The views are generated by creating a projection of the spherical view into a planar view for the display that simulates the view from the virtual camera with the current orientation.

After a period of time, the views have changed at time 308. The orientation of the virtual cameras may change independently from each other, as set by the user. The user may change the orientation by panning the camera view with the finger on the touchscreen or by setting key frames, as discussed below, where the key frames may be set independently in each of the cameras.

Figure 4:
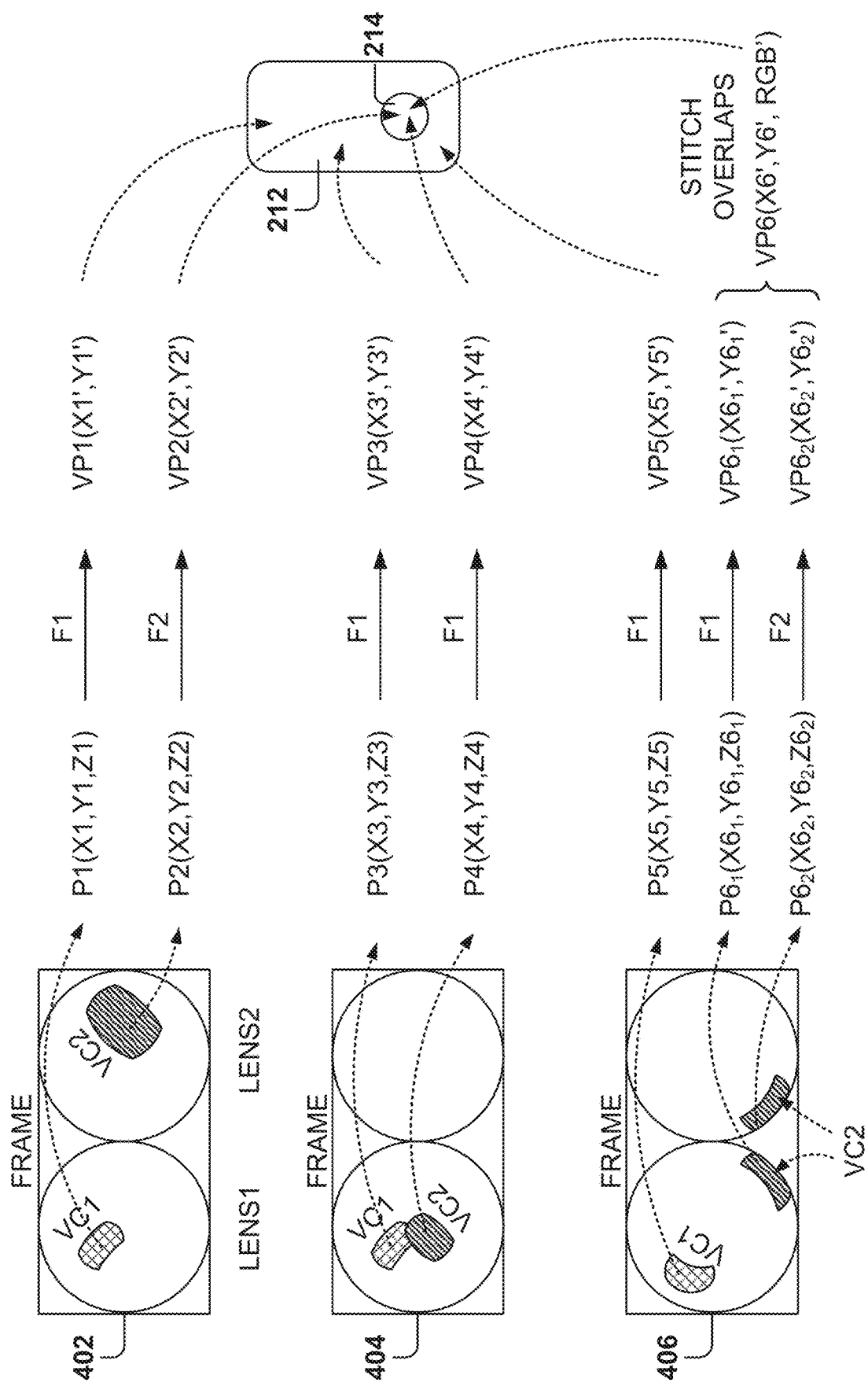
FIG. 4 illustrates several embodiments for processing frame data to create the user interface view.

FIG. 4 illustrates several embodiments for processing frame data to create the user interface view. Each frame of the video data includes the information captured by both lenses, and the frames are transmitted from the camera to the mobile device 202. In some example embodiments, the mobile device 202 analyzes the data from each frame to generate pixel data for presentation on the display. In other embodiments, the processing of the data may be performed at the camera 102 and display data transmitted to the mobile device 202.

In some example embodiments, the video data from each lens includes pixels with coordinates in a three-dimensional space (e.g., x, y, z) and the corresponding RGB value. This means that each pixel has coordinates with reference to the base plane and a z value corresponding to the depth of the pixel with the reference to the origin. In some example embodiments, the data from each lens is referenced for an origin at the lens and a depth dimension extending out in the direction that the lens is oriented. More details regarding the projection into a flat display are provided below with reference to FIG. 16. In other example embodiments, other coordinate systems may be utilized.

Each lens has a transformation function F to convert pixels in the captured frame to pixels in the presentation view. The transformation function may depend on many variables, such as the focal length of the lens and the unique characteristics of each lens. Therefore, the transformation functions for two lenses of the same model may be the same or slightly different. As used herein, the front lens has a transformation function $F_1$ and the back lens has a transformation function $F_2$.

Frame 402 illustrates how lens 1 is capturing data for virtual camera 1 and lens 2 is capturing data for virtual camera 2. A pixel $P_1$ for virtual camera 1 includes coordinates $(x_1, y_1, x_1)$ (represented herein as $P_1(x_1, y_1, z_1)$), and using transformation function $F_1$, the pixel $P_1$ is converted to a virtual pixel $VP_i$ for presentation on the virtual display with coordinates $(x_1', y_1')$. Similarly, pixel $P_2(x_2, y_2, z_2)$ for virtual camera 2 is converted to virtual pixel $VP_2(x_2', y_2')$.

Frame 404 shows how the virtual cameras are both on the view of lens 1, even with an overlapping portion. Therefore, pixels for both virtual views are converted utilizing function $F_1$. Pixel $P_3(x_3, y_3, z_3)$ from lens 1 is converted to virtual pixel $VP_3(x_3', y_3')$ for the first virtual view utilizing $F_1$. Pixel $P_4(x_4, y_4, z_4)$ from lens 1 is converted to virtual pixel $VP_4(x_4', y_4')$ for the virtual camera 2.

Frame 406 shows how the virtual camera 1 is still being captured by lens 1 and that virtual camera 2 is being captured by both lenses simultaneously, in the region where the views from the lenses overlap. In this case, pixel $P_5$ is transformed utilizing function $F_1$ and a pixel $P_6$ is transformed based on two components, one from each lens: $P_{61}(x_{61}, y_{61}, z_{61})$ from lens 1 and $P_{62}(x_{62}, y_{62}, x_{62})$ from lens 2.

Pixels $P_{61}$ and $P_{62}$ may then be blended by obtaining an RGB value based on the respective RGB values, as well as the RGB values in the nearby pixels. In some embodiments, Laplacian blending may be utilized for stitching the images, but other blending algorithms may be utilized. Blending pixels directly may cause unnatural changes on the video image. With Laplacian blending, a region of pixels is progressively divided into smaller pyramids to generate a natural blend.

Figure 5:
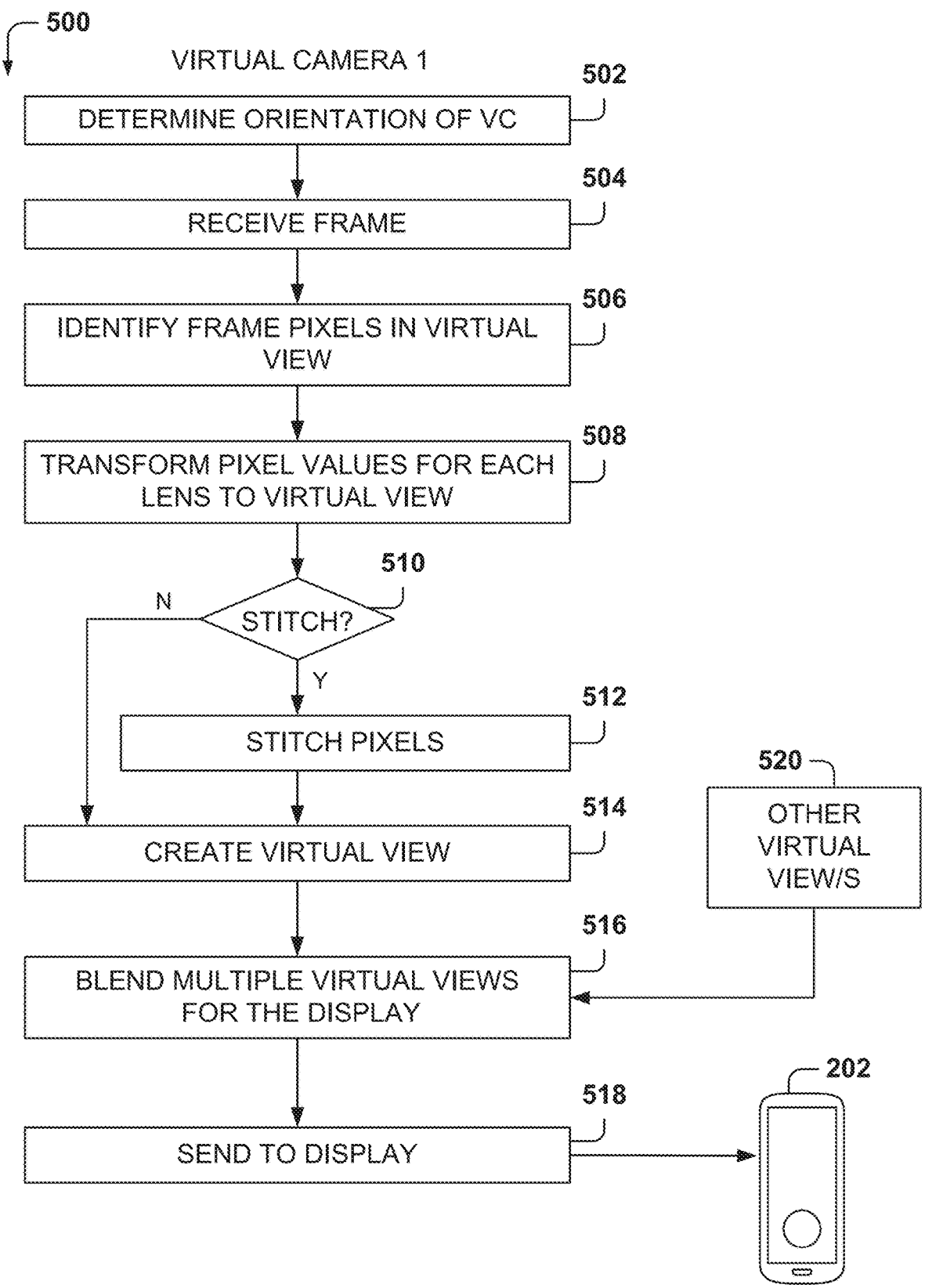
FIG. 5 is a flowchart of a method for generating the user interface view, according to some example embodiments.

FIG. 5 is a flowchart of a method for generating the user interface view, according to some example embodiments. While the various operations in this flowchart are presented and described sequentially, one of ordinary skill will appreciate that some or all of the operations may be executed in a different order, be combined or omitted, or be executed in parallel.

At operation 502, the orientation of the virtual camera, within the spherical view surrounding the camera, is determined. The orientation is used to determine which pixels are used for the virtual view.

From operation 502, the method flows to operation 504 where a frame is received. It is noted that, although the operations of the method 500 referred to processing one frame at a time, other embodiments may receive multiple frames simultaneously and process them to generate a virtual view.

At operation 506, the pixels in the frame corresponding to the virtual view are identified, and at operation 508, the pixel values in the frame are converted for the corresponding lens or lenses, to the pixels for the virtual view. More details are provided below with reference to FIG. 16 for an example embodiment for converting pixel data captured by the lens to pixel data for the projection to be presented on the display.

From operation 508, the method flows to operation 510 where a check is made to determine if stitching of pixel data is required (e.g., virtual camera 2 for frame 406 of FIG. 4). If stitching is required, the method flows to operation 510 where the pixels from the two lenses are stitched together. As described above, the stitching may be done based on one pixel or on a plurality of pixels within an area. If the stitching is not required, the method flows to operation 514 where the virtual view is created by adding the transformed pixel to the virtual view.

When multiple virtual views are being displayed simultaneously, the same process is repeated for the other virtual views 520, with their respective pixel information. In some example embodiments, the processing for each virtual camera is performed in parallel, e.g. by different threads executing in the computing device 102. The frame data is input to each process as well as the characteristics of the virtual camera associated with each of the processes. The process then generates the projection for presentation on the display for the virtual camera. In some example embodiments, each of the processes is executed by one or more cores of a Graphics Processing Unit (GPU). Other embodiments may utilize different cores on a CPU.

In some example embodiments, the Open Graphics Library (OpenGL) is used for rendering 2D and 3D) vector graphics. The OpenGL is a cross-language, cross-platform application programming interface (API) used for rendering 2D and 3D vector graphics. The OpenGL API maybe used to interact with a GPU or a CPU to achieve hardware-accelerated rendering.

Once all the virtual camera views have been rendered, the virtual views are blended together at operation 516, and the result is sent\d to display 518 for presentation on the computing device 202.

Figure 6:
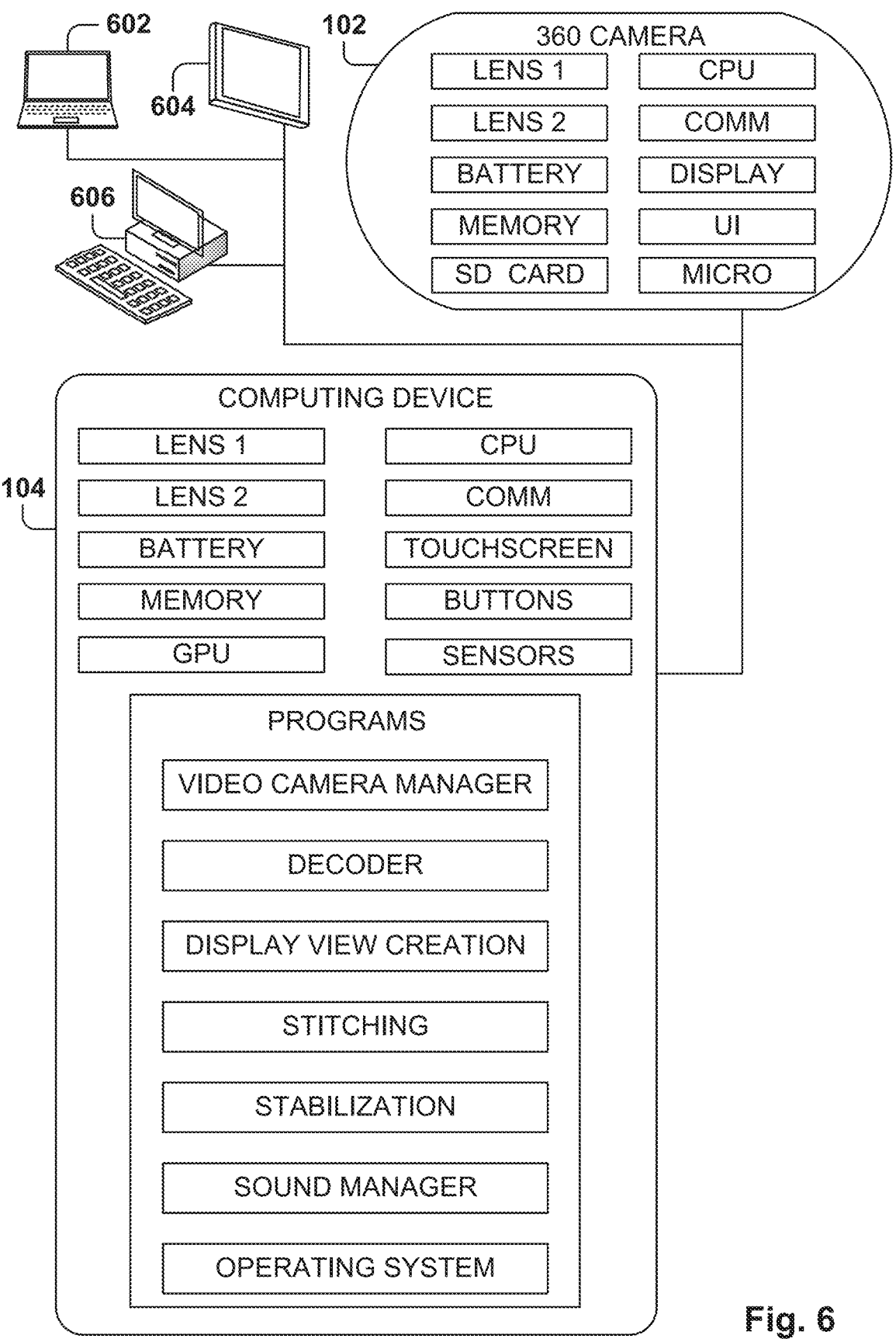
FIG. 6 is an exemplary computer architecture for implementing embodiments.

FIG. 6 is an exemplary computer architecture for implementing embodiments. The 360-degree camera 102 may be coupled to a computing device, such as smart phone 104, laptop 602, tablet 604, desktop 606, a server computer, etc. The coupling may be performed directly with a direct wired connection or via a network, wired or wireless.

In some example embodiments, the 360-degree camera 102 includes two lenses, a battery, one or more CPUs (processors), one or more displays, RAM memory, ROM memory, permanent storage (e.g., an SD card, flash memory, or a hard drive), one or more microphones, and a user interface program. In some example embodiments, the 360-degree camera 102 includes one microphone in the front and another microphone in the back, but other embodiments may utilize additional microphones (e.g., on the sides of the camera or on the top or bottom of the camera).

In some example embodiments, the computing device 104 includes one or more lenses, one or more CPUs (processors), communication modules (e.g., cellular data, Wi-Fi), a battery, a touchscreen or a display, RAM memory, ROM memory, permanent storage (e.g., SD card, flash memory, or a hard drive) one or more interface buttons, one or more GPUs, and one or more sensors (e.g., fingerprint reader, GPS sensor, inertial sensors).

Additionally, a plurality of programs may be executed by the one or more processors or the one or more GPUs. In some example embodiments, the programs include a video camera manager, a decoder, a display view creation module, a stitching module, a stabilization module, a sound manager module, and an operating system. The modules may be implemented in hardware, software, or a combination thereof.

In some example embodiments, the 360-degree camera 102 transmits video data at 30 frames a second in 4K resolution via a wired connection to computing device 104. Compression algorithms are utilized to be able to send the large amount of data required to send video data of these high-resolution for live viewing of video on the computing device. In some example embodiments, the 360-degree camera 102 provides a user interface to the computing device to see the video files stored in the SD card, and the computing device is able to request viewing of any video file on the computing device. The data is streamed live from the 360-degree camera 102 to the computing device 104 so the user does not have to download tiles to the computing device before the videos may be shown on the display of the computing device 104.

The video camera manager is an application that coordinates the activities for interacting with the 360-degree camera 102, such as providing a user interface, programming the processing of the raw data received from the 360-degree camera 102, etc. The decoder processes the frame data to generate the display view (e.g., as illustrated above with reference to FIGS. 4-5).

The display view creation module manages the operation of the virtual cameras and how they map to the frame data received from the 360-degree camera 102. The stitching module stitches data when a pixel overlaps data captured by both lenses. The stabilization module generates stabilized views on the computing device 104. The 360-degree camera 102 may be in motion while recording, so straight display of the data captured may result in strange or undesired views. The stabilization module accounts for the motion of the 360-degree camera 102 to generate results similar to those that would be obtained with a camera at rest or slightly in motion.

The sound manager manages the sound data received from the 360-degree camera 102 to create sounds effect that simulate the sound that would be received by a regular camera oriented in the direction of the virtual view camera. The sound manager identifies the orientation vector for the virtual camera and blends the sounds received from the multiple microphones, and their respective orientation vectors, to create the desired effect.

It is noted that the embodiments illustrated in FIG. 6 are examples and do not describe every possible embodiment. Other embodiments may utilize different modules, fewer modules, additional modules, combine the functionality of several modules into one module, etc. The embodiments illustrated in FIG. 6 should therefore not be interpreted to be exclusive or limiting, but rather illustrative.

Figure 7:
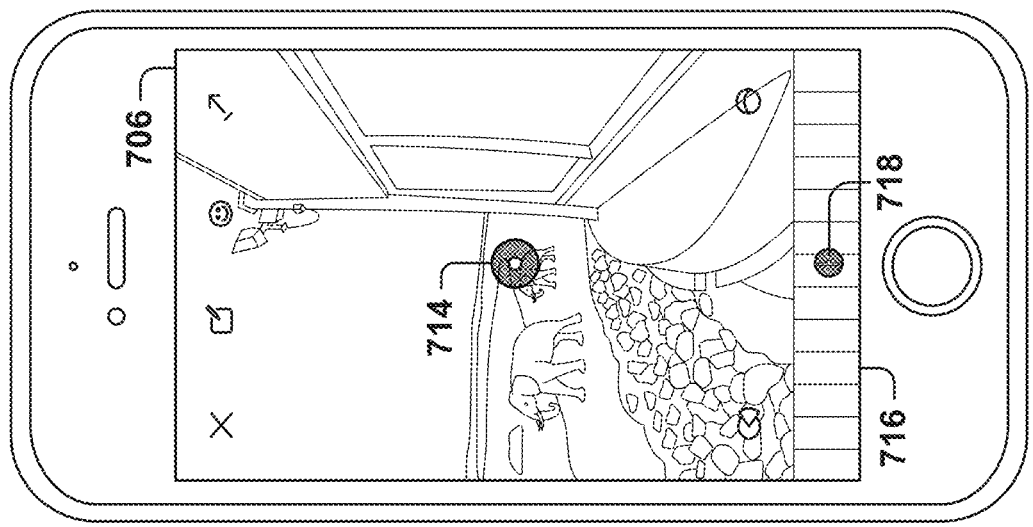
FIGS. 7 and 8 show several user interface views for selecting a virtual-camera orientation, according to some example embodiments.
Figure 7:
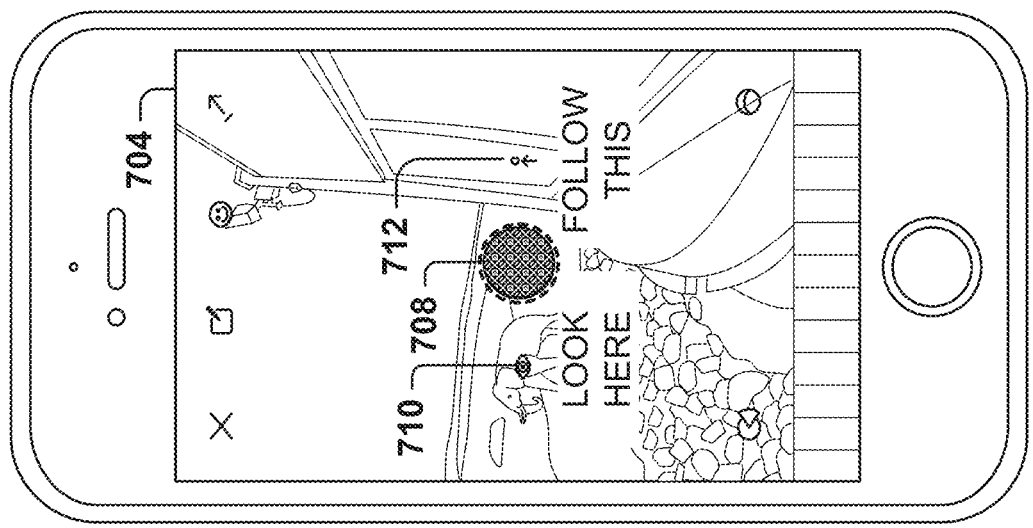
Figure 7:
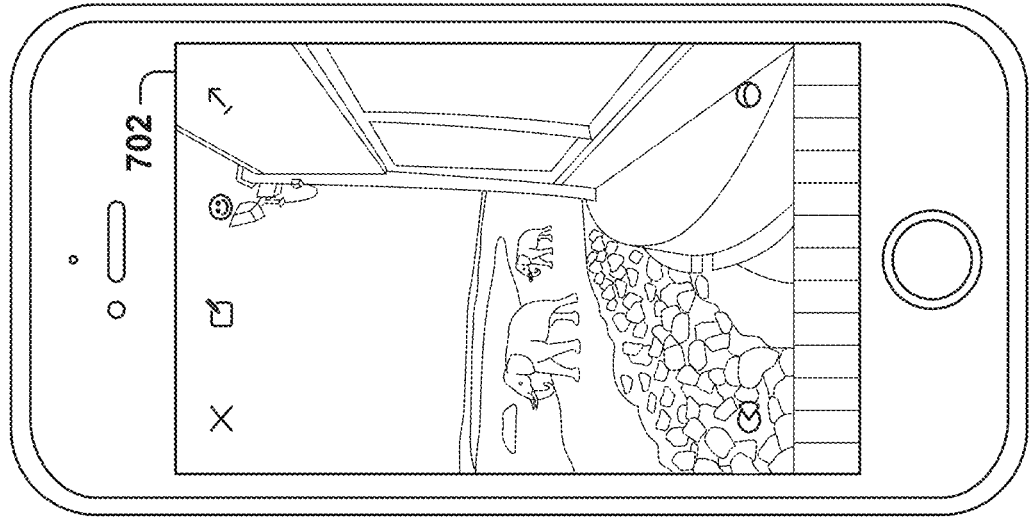
Figure 8:
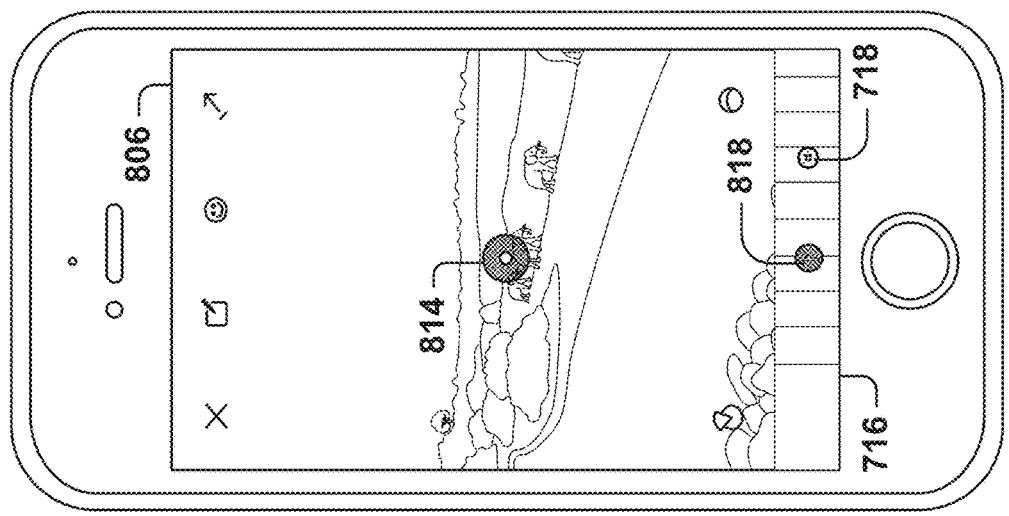
Figure 8:
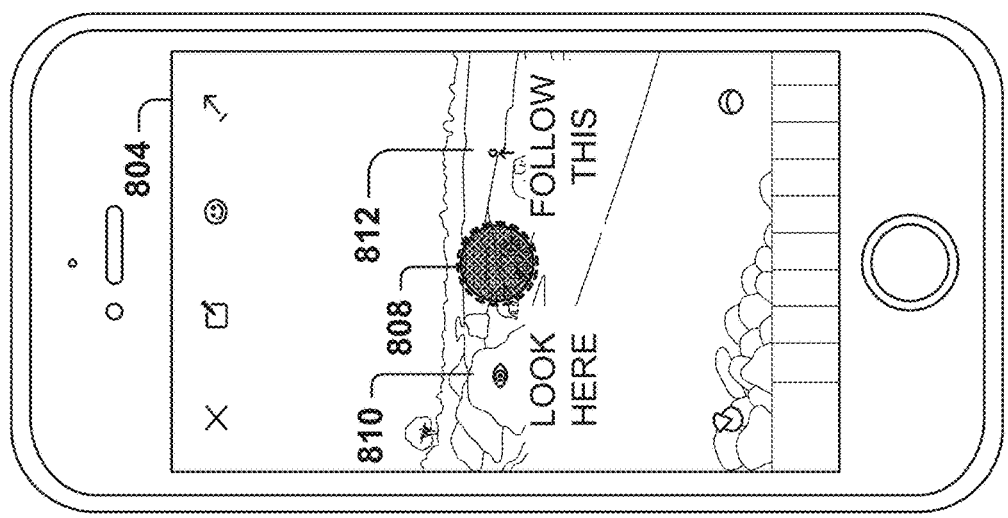
Figure 8:
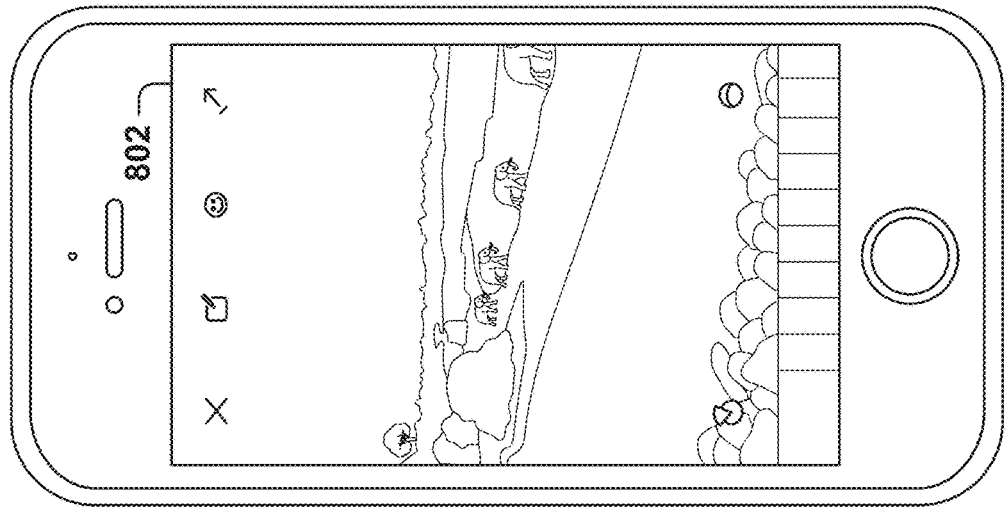

FIGS. 7 and 8 show several user interface views for selecting a virtual-camera orientation, according to some example embodiment. In some example embodiments, the user interface provides the option to identify points in certain frames of the video, referred to herein as key frames, that define the orientation of the virtual camera.

There are two types of key frames: an orientation key frame and a landmark key frame. The orientation keyframe defines the orientation of the virtual camera in that key frame and the video replay application provides for a smooth transition of the virtual camera view from one orientation key frame to the next orientation key frame.

The landmark key frame identifies an area of the display, referred to herein as the landmark, and is associated with a plurality of video frames that follow (for a period of time defining the duration of the landmark-following effect), such that the video frames that follow are oriented towards the landmark.

FIGS. 7 and 8 illustrate how to create the orientation key frames and the corresponding virtual camera orientations. The user has stopped video replay at frame 702. To create the orientation key frame, the user presses the finger on the desired point 708 and holds for a predetermined amount of time (e.g., 1 second or more but other intervals are also possible).

The user interface marks the orientation point 708 and provides two options: a look-here option 710 and a follow-this landmark option 712. To set the orientation key frame, the user taps on the look-here option 710 and the orientation point 714 is created as illustrated in frame 706. A mark is presented on the frame, such as a circle, to show the orientation point, but other shapes are also possible.

In addition, a symbol 718 for the orientation keyframe is added on the video timeline 716 at the bottom of the interface. The video timeline 716 is presented when the video playing stops and represents the different video frames over time. The user may swipe the finger left or right to move the video frame backwards or forward. The orientation point is used by the video player to make the virtual video player "look" at the orientation point at that frame.

If no other orientation key frames are defined in the video, the orientation of the virtual camera after the playing of the key frame, may evolve as usual. However, if other orientation key frames are defined in the video, the video playing application will set the orientations of the frames between two orientation key frames such that there is a smooth transition from one orientation key frame to another.

This way, a beautiful pan effect may be created to focus the video on a desired orientation for a certain period of time. For example, if the camera is on the side of the road and a car is passing by (e.g., in a car race), a first orientation may be set on the car when his entering the view, and the second orientation at another later point (e.g., when the car is fading away). When the video plays, the result is that the video camera appears to be following the car as the car passes by. Additionally, the effect may be used to make transitions from one scene to another. For example, a transition can be made in a party with multiple groups from one group to another, and then to another, etc.

FIG. 8 shows how to set up another orientation keyframe, by identifying another frame on the video and repeating the operation to create the orientation key frame. The result is the orientation point 814. In this example, the user has gone backwards to create the second orientation key frame, but it is also possible to go forward in the video. The video timeline 716 shows now both key frame markers 818 and 718.

In some example embodiments, in order to remove an orientation key frame, the user may point at the marker in the video timeline, then tap the marker in the center of the frame and tap an "X" to remove it.

It is noted that in other solutions, a recording may be made as the user plays a video, while capturing how the user moves the orientation of the virtual camera. Then, an option is provided to repeat the same playback. This type of solution is awkward to use and depends on the abilities of the user to quickly move the camera. Using orientation key frames is an easy way to set up exact and smooth transitions with the desired virtual camera angles.

Figure 9:
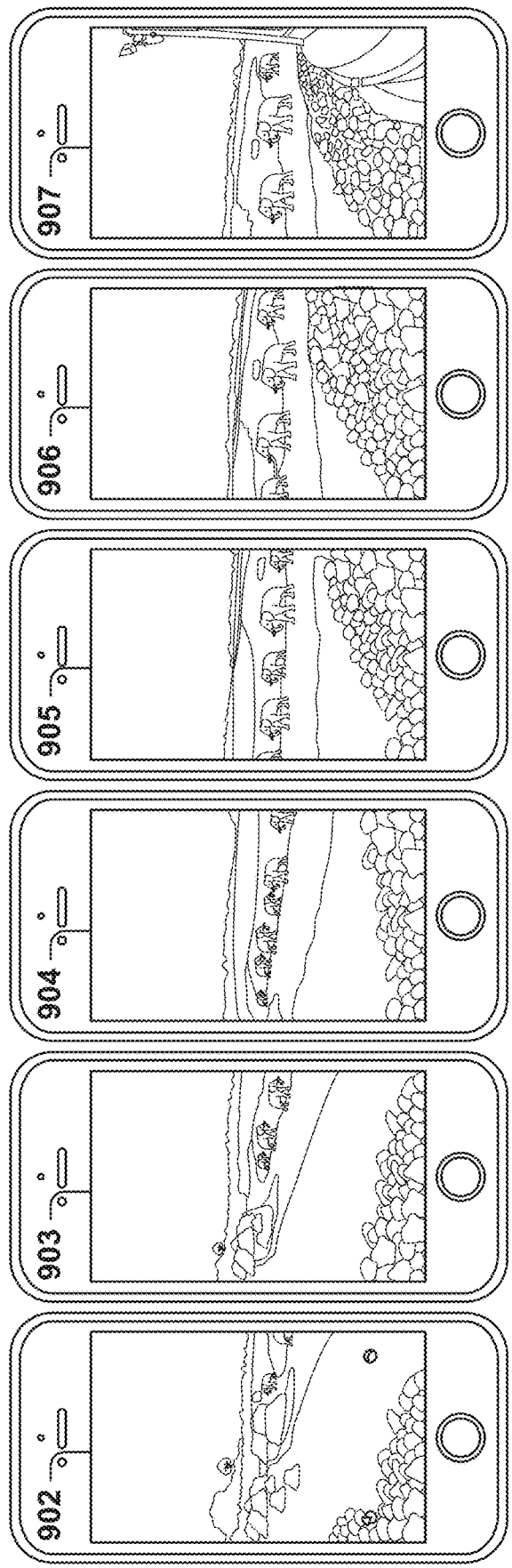
FIG. 9 shows several views as the video plays while the virtual-camera orientation changes, according to some example embodiments.

FIG. 9 shows several views as the video plays while the virtual-camera orientation changes, according to some example embodiments. FIG. 9 shows how the video plays after setting up the orientation key frames. Frames 902-907 show the progression of the video as it plays along.

Frame 902 occurs before the first key frame, and frame 903 is for the time of the key frame. It can be seen how the video started in a different orientation, but the video player changed the orientation as requested.

The frames continue playing until frame 907, corresponding to the second key frame. It can be seen how the frames 904-906 (between 903 and 907) gradually change the orientation of the virtual camera to reach the second key frame with a smooth transition. The video player interpolates the orientation for the intermediate frames to provide the smooth transition.

Figure 10A:
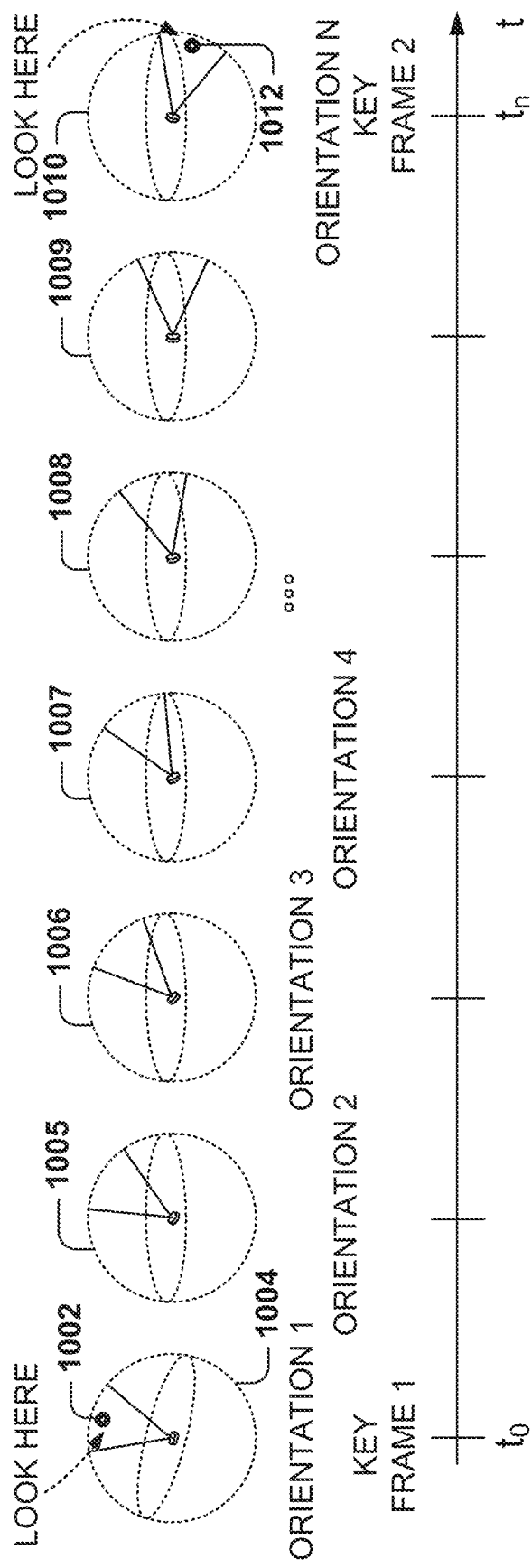
FIG. 10A is a time diagram showing the evolution of the orientation based on key frames with predetermined orientations, according to some example embodiments.

FIG. 10A is a time diagram showing the evolution of the orientation based on key frames with predetermined orientations, according to some example embodiments. Key frame 1004 includes an orientation point 1002 and key frame 1010 includes orientation point 1012. Key frame 1004 takes place at time $t_0$ and key frame 1010 takes place at time $t_n$. Frames 1005-1009 show the evolution of the orientation of the virtual camera within the spherical space, and are distributed between times $t_0$ and $t_n$.

The video play application calculates the orientations of frames 1005-1009 in order to provide that smooth transition between key frames 1004 and 1010. In sonic embodiments, the orientation changes linearly, that is, an equal orientation change is introduced between frames, for all the frames between the two key frames. However, this may result in abrupt orientation changes right before or right after a key frame. To avoid these sudden changes in orientation, other embodiments utilize orientation changes that are based not only on the two key frames at the endpoints, but also on other key frames that might occur outside that interval, as illustrated in FIG. 10B.

Figure 10B:
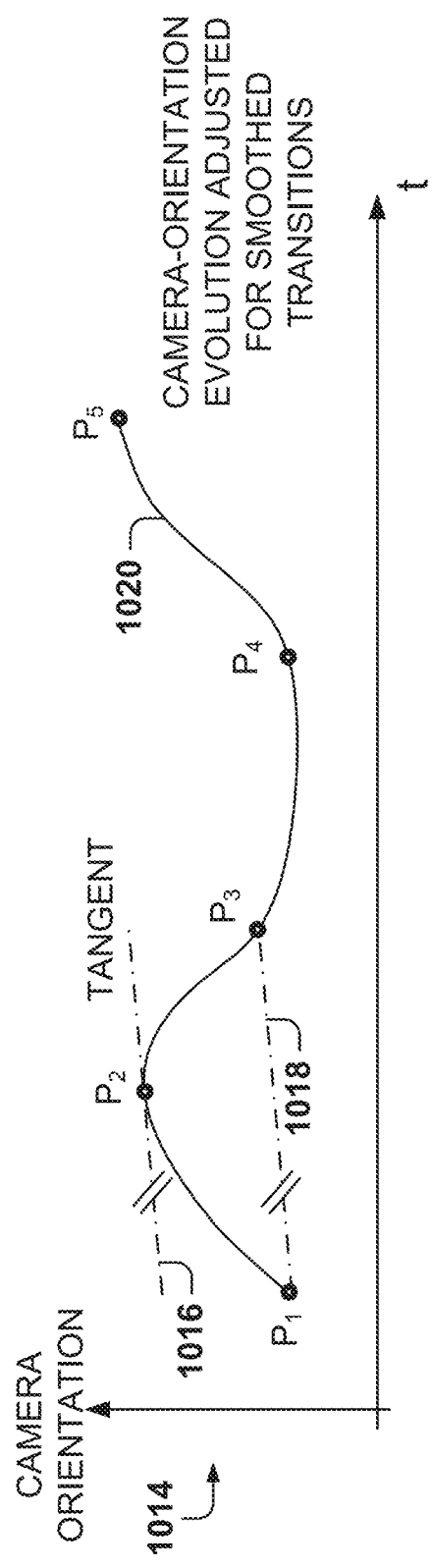
FIG. 10B is a chart showing the creation of the smooth orientation transitions while playing the video, according to some example embodiments.

FIG. 10B is a chart 1014 showing the creation of the smooth orientation transitions while playing the video, according to some example embodiments. Chart 1014 illustrates the orientation of the camera over time when five different key frames $P_1$-$P_5$ have being created. For simplicity of description, the points are assumed to be in the same plane so the orientation change is presented in two dimensions. However, the same principles may be applied when the orientation points are on a 3D space.

Curve fitting is the process of constructing a curve 1020 that has the best fit to a series of data points. Curve fitting can involve either interpolation, where an exact fit to the data is required, or smoothing, in which a "smooth" function is constructed that approximately fits the dat. In some embodiments, an interpolation approach is used for creating the curve that defines the orientation to exactly meet the user requirements for the key frames, and a "smoothing" effect is also accomplished. The fitted curve 1020 is used to infer values of a function where no data is available.

In some example embodiments, to create the orientation between points P1 and P2, a line 1018 is created between points P1 and P3, and a tangent line 1016 is created at P2 that is parallel to line 1018. Thus, at P2, the curve 1020 is created such that it is tangent with line 1016.

There are multiple filling curves that they may be utilized for curve fitting along the defined key frames. For example, the fitting curve may be a first-degree polynomial equation (in the form of y=ax+b), or a second-degree polynomial (y=ax$^2$+bx+c), or third degree (y=ax$^3$+bx$^2$+cx+d), and so forth.

In some example embodiments, the order of the polynomial fitting curve may be equal to the number of key frames. For example, if there are four key frames, then a polynomial of the fourth order is used to fit the four points.

In other example embodiments, other polynomial functions may be utilized of the less degree. For example, a third-degree polynomial function maybe used, and this function may be used between P1 and P2 utilizing points P1-P3 to fit the curve. The process is then repeated to fit the curve between P2 and P3 utilizing points P2-P4, etc. In other example embodiments, other fitting functions may also be utilized, such as trigonometric functions, a Bezier curve, or a Quaternion interpolation.

Once the curve 1020 is identified, the curve determines the orientation at each of the intermediate points between key frames, providing smooth transitions for the virtual camera orientations.

In some example embodiments, a Spherical Spline Quaternion Interpolation (Squad) is utilized for the calculation of the orientations in the three-dimensional space, but other curve fitting methods may be utilized. The Squad interpolation is analogous to a Bezier curve, but involves spherical linear interpolation instead of simple linear interpolation.

As discussed earlier, the sound generated at each frame is also calculated based on the orientation of the virtual camera by generating a sound vector based on the sound vectors of the one or more microphones in the 360-degree camera 102.

Figure 11:
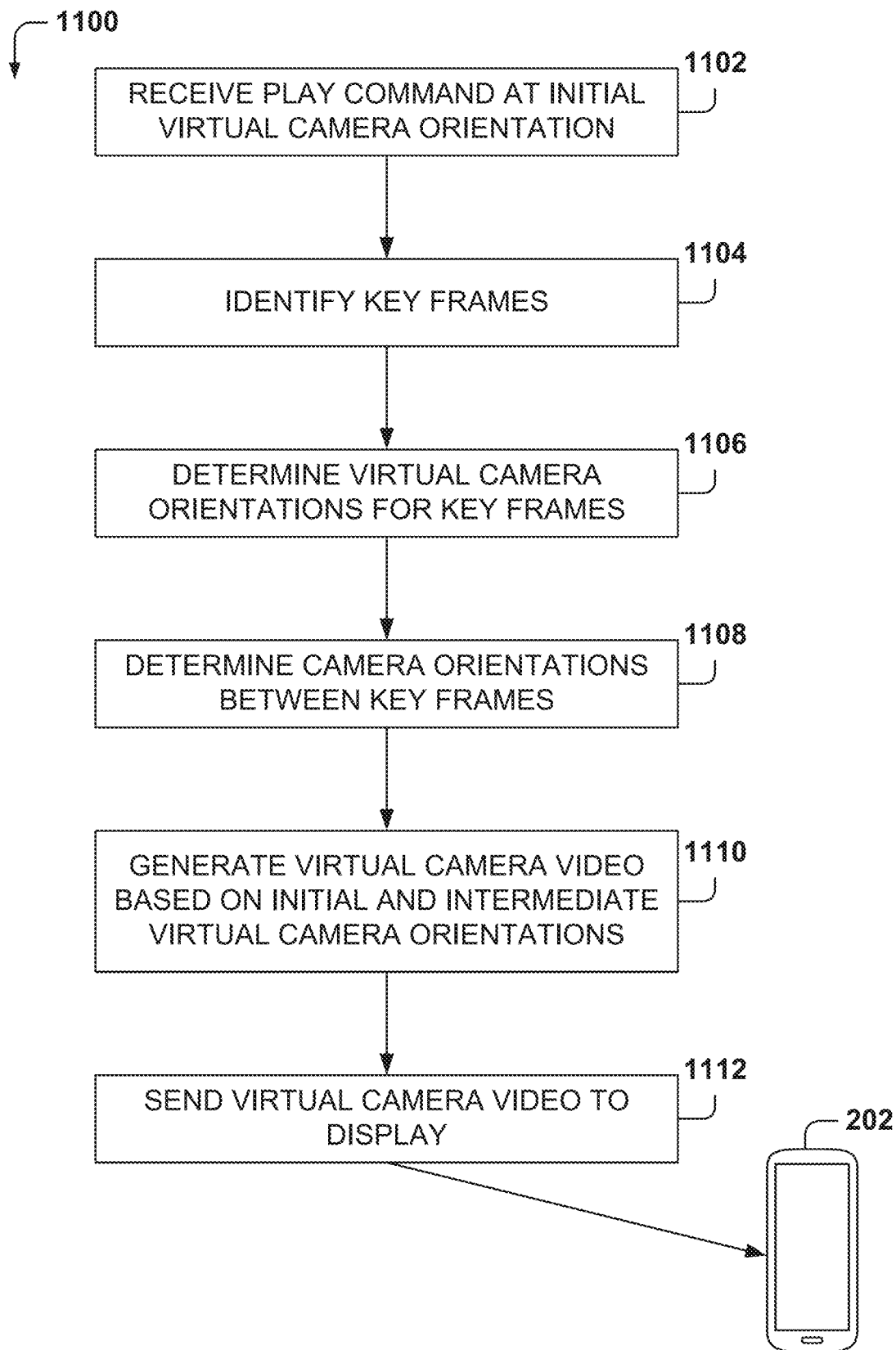
FIG. 11 is a flowchart of a method for creating a video with integrated orientation points, according to some example embodiments.

FIG. 11 is a flowchart of a method for creating a video with integrated orientation points, according to some example embodiments. While the various operations in this flowchart are presented and described sequentially, one of ordinary skill will appreciate that some or all of the operations may be executed in a different order, be combined or omitted, or be executed in parallel.

At operation 1102, a play command is received, starting with an initial defined virtual camera orientation. For example, before sending the play command, the user may change the orientation of the virtual camera with his finger by dragging the finger across the touch screen until the desired orientation is obtained.

At operation 1104, the key frames set by the user are identified. At operation 106, the orientations for the orientation key frames are determined, based on the orientation points set at each of the orientation key frames.

At operation 1108, the orientations of the virtual camera at the frames between the key frames are determined, such as by using the interpolation method described with reference to FIG. 10B.

At operation 1110, the video of the virtual camera is generated based on the orientations of the key frames and the calculated orientations of the frames between the key frames. At operation 1112, the video corresponding to the virtual camera, with the set orientations, is sent to the display of the mobile device 202.

Figure 12:
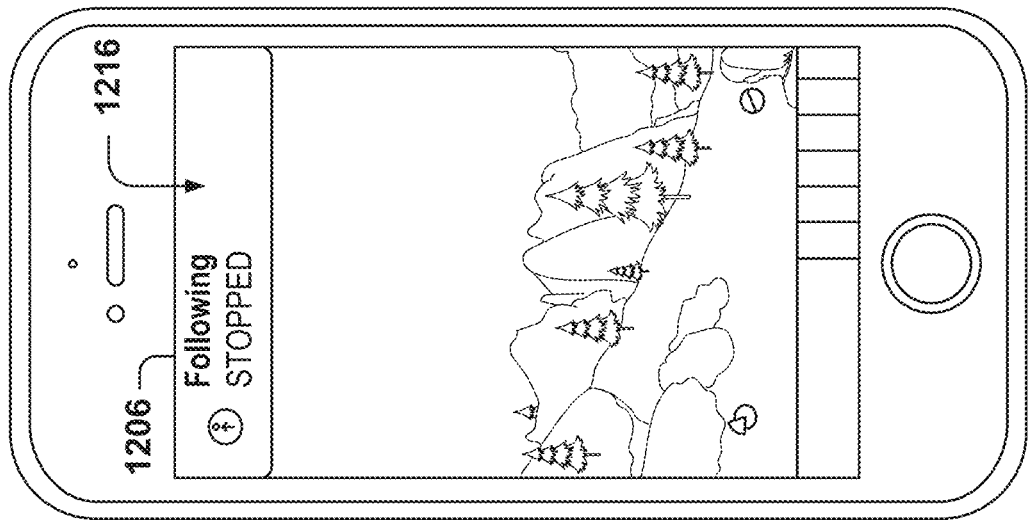
FIG. 12 illustrates a user interface for selecting a landmark area to be tracked while playing the video, according to some example embodiments.
Figure 12:
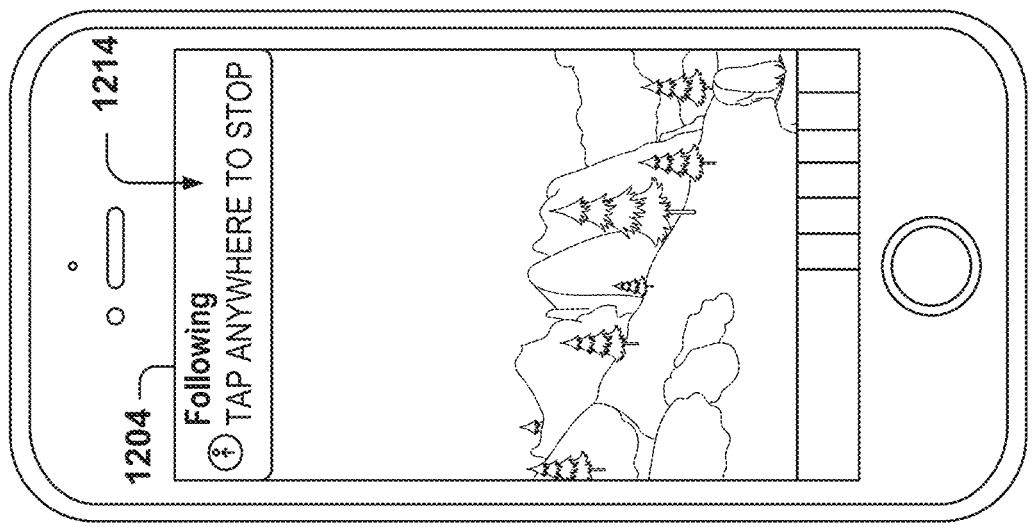
Figure 12:
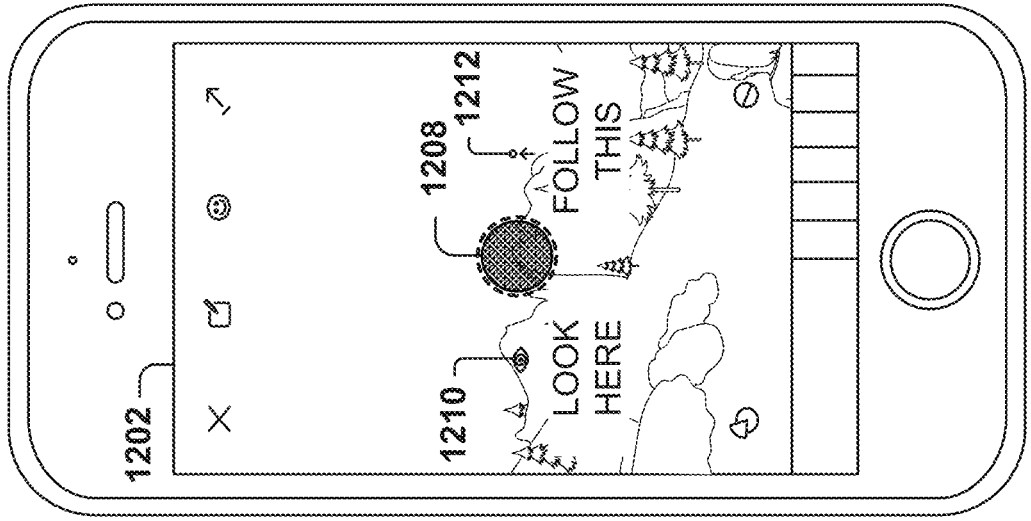

FIG. 12 illustrates a user interface for selecting a landmark area to be tracked while playing the video, according to some example embodiments. Another option for setting the orientation during playback is to create a landmark key frame. A landmark, as used herein, refers to an area of the display selected by the user. As the video plays, the playback program compares a frame with the previous one to determine where the landmark is now located (unless the landmark disappears from sight).

The landmark in the next frame is determined by comparing the pixels with the pixels of the previous frame to determine the location of the landmark. Since the video is played at 30 frames a second, in some example embodiments, most often the landmark will not change the position much, and determining the new position of the landmark includes determining how the pixels in the area have moved or if they have stayed in the same place.

When a landmark key frame is created, the user also identifies a period of time for following the landmark, and as long as the landmark is present within that period of time, the virtual camera will follow the landmark, which means that the virtual camera changes orientation to track the landmark.

The creation of the landmark starts in the same way as when creating the orientation key frame; the user taps and hold the touchscreen until an option is presented to select between setting and orientation key frame 1210 or a landmark key frame 1212. The area of the landmark 1208 is shown on the display and if the user selects the option 1212 to "follow this," then a message 1214 appears on the top of the user interface as shown in frame 1204.

In some example embodiments, the message includes the word "Following" and a message indicating "Tap anywhere to stop." After a period of time, the user taps on the touchscreen, and the message 1214 is presented as shown in frame 1206. The message 1214, in some example embodiments, is "Following stopped," but other similar messages are also possible. The frame 1214 becomes the last frame of the time interval for following the landmark. After frame 1214, the video will resume playing without tracking the landmark.

It is possible to combine orientation key frames with landmark key frames, and the video playback will adjust the orientation to satisfy all the key frames constraints. An example is described below with reference to FIG. 14B.

To remove the landmark key frame, the user selects the desired frame on the video timeline and then selects "X" to delete the landmark key frame.

The landmark key frame is very convenient to set up the orientation by the user. As described above, it only takes a few taps by the user to set orientation over a period of time. For example, the landmark may be used to track a child moving in a playground, a car driving by, a bird flying above, etc. With just a few taps, the user may playback a video showing the element of interest without requiring doing complex video editing operations.

Figure 13:
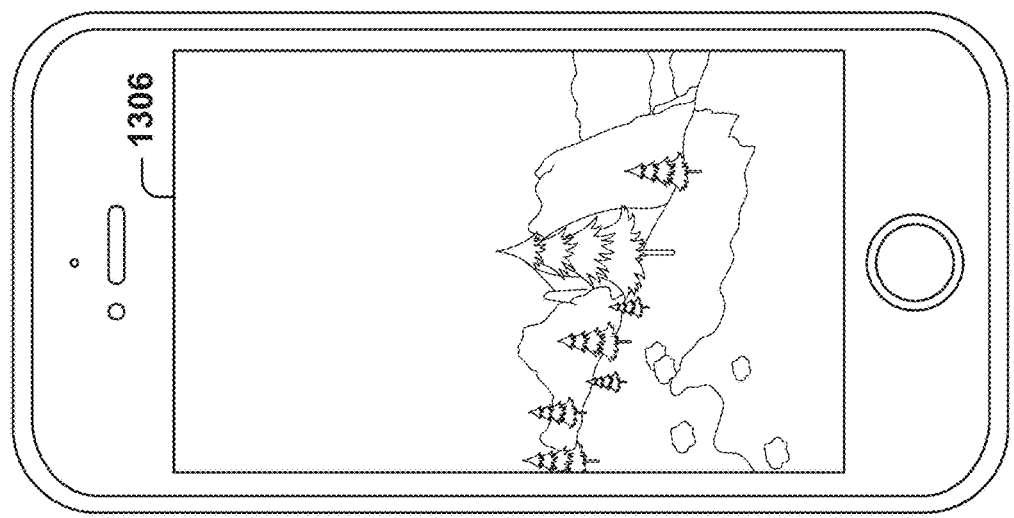
FIG. 13 shows how the camera orientation changes to track a landmark while showing the video, according to some example embodiments.
Figure 13:
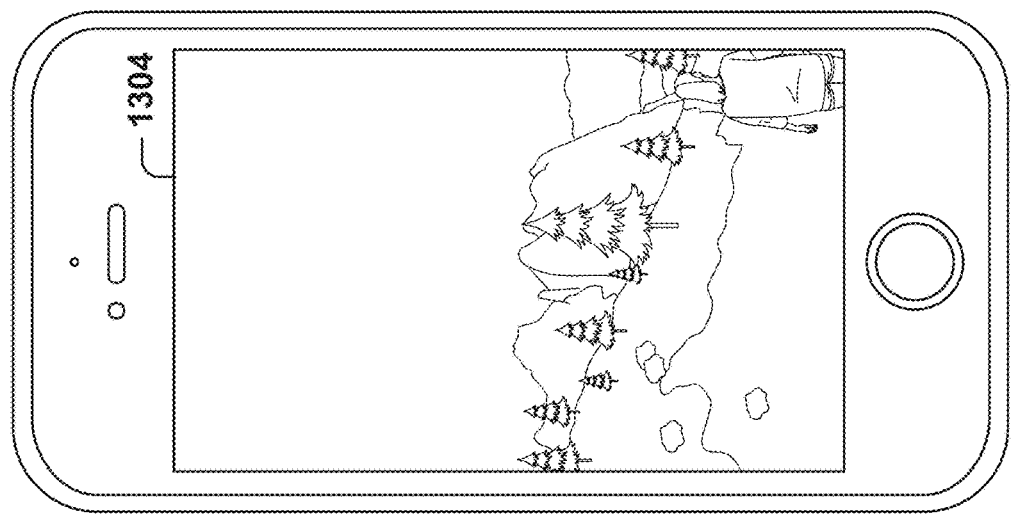
Figure 13:
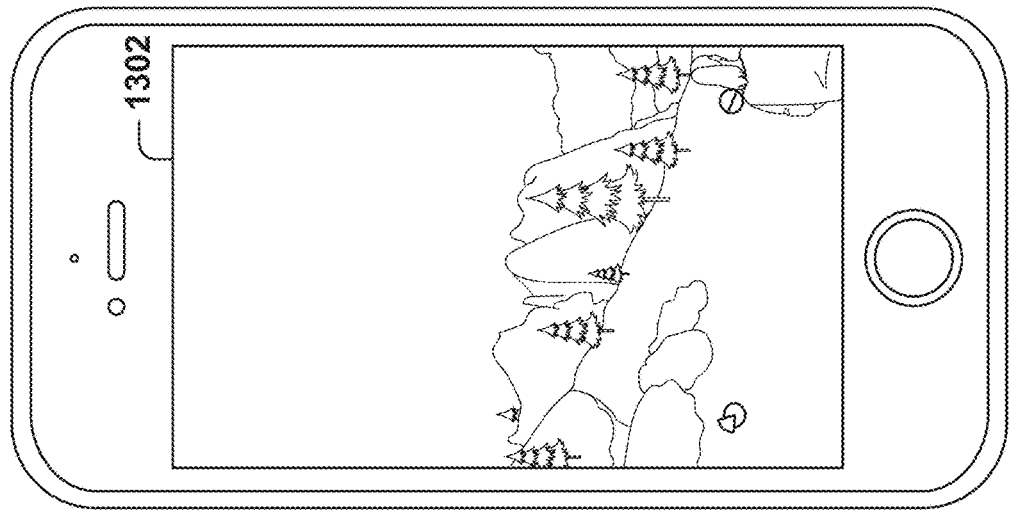

FIG. 13 shows how the camera orientation changes to track a landmark while showing the video, according to some example embodiments. FIG. 13 shows three frames resulting from playing the video when tracking the set landmark, which corresponds to the peak of the mountain in the middle. The video is captured by a runner that is following another runner, whose back may be seen on some of the frames. Therefore, since the camera is in motion, the still landmark is in motion relative to the runner.

At frame 1302, the video camera orientation is centered on the landmark and part of the lead runner is shown. Later on, at frame 1304 a few seconds later, the landmark is still centered but the perspective has changed, as a tall tree is now closer to the mountain peak. The back of the runner is still visible.

At frame 1306, a few seconds after frame 1304, the landmark is still centered on the view but the tall tree is now in front of the landmark. Further, the camera orientation has shifted towards the left to follow the landmark and the lead runner is not visible.

FIG. 14A is a time diagram showing the evolution of the orientation while tracking a landmark, according to some example embodiments. At frame 1004 for time $t_0$, the landmark 1402 is set by the user. Additionally, the user sets a tracking interval for tracking the landmark, that ends at frame 1408 (time $t_i$). The tracking interval, also referred to as the follow interval, is the interval between times $t_0$ and $t_i$. Furthermore, in this example, an orientation key frame 1410 is created afterwards at tune $t_n$, with an orientation defined by point 1412.

In FIG. 14A, the landmark point 1402 is represented by an "X" and the orientation point 1412 is represented by a circle. In frames 1405-1408, it may be seen that the landmark point 1402 is moving towards the left. Therefore, the orientation of the virtual camera also moves towards the left following the landmark point.

Further, the orientation point 1412 is below and to the left of the landmark as set in the last frame of the follow interval. The playback program then creates a transition from frame 1408 to frame 1410, as if an orientation point were set at frame 1408. This way, the playback of this video will produce a smooth orientation transition throughout the whole playback.

FIG. 14B is a chart showing the creation of the smooth orientation transitions while playing the video, according to some example embodiments. As in FIG. 10B, chart 1414 illustrates the orientation change over time for a two-dimensional illustration.

In this example, orientation points $P_1$-$P_3$ and $P_6$ have been defined. Further, a landmark point $P_4$ has been created with a follow interval that ends at point $P_5$. The orientation of the virtual camera between $P_1$ and $P_4$ is calculated via interpolation, as described above with reference to FIG. 10B, and $P_4$ is treated as an orientation point for this initial section since $P_4$ also defines a virtual camera orientation.

From $P_4$ to $P_5$, the orientation is set by the landmark, and other key frames are not considered within this section, just the position of the landmark. From $P_5$ to $P_6$, interpolation is used again to calculate the orientations for the frames within this period.

Figure 15:
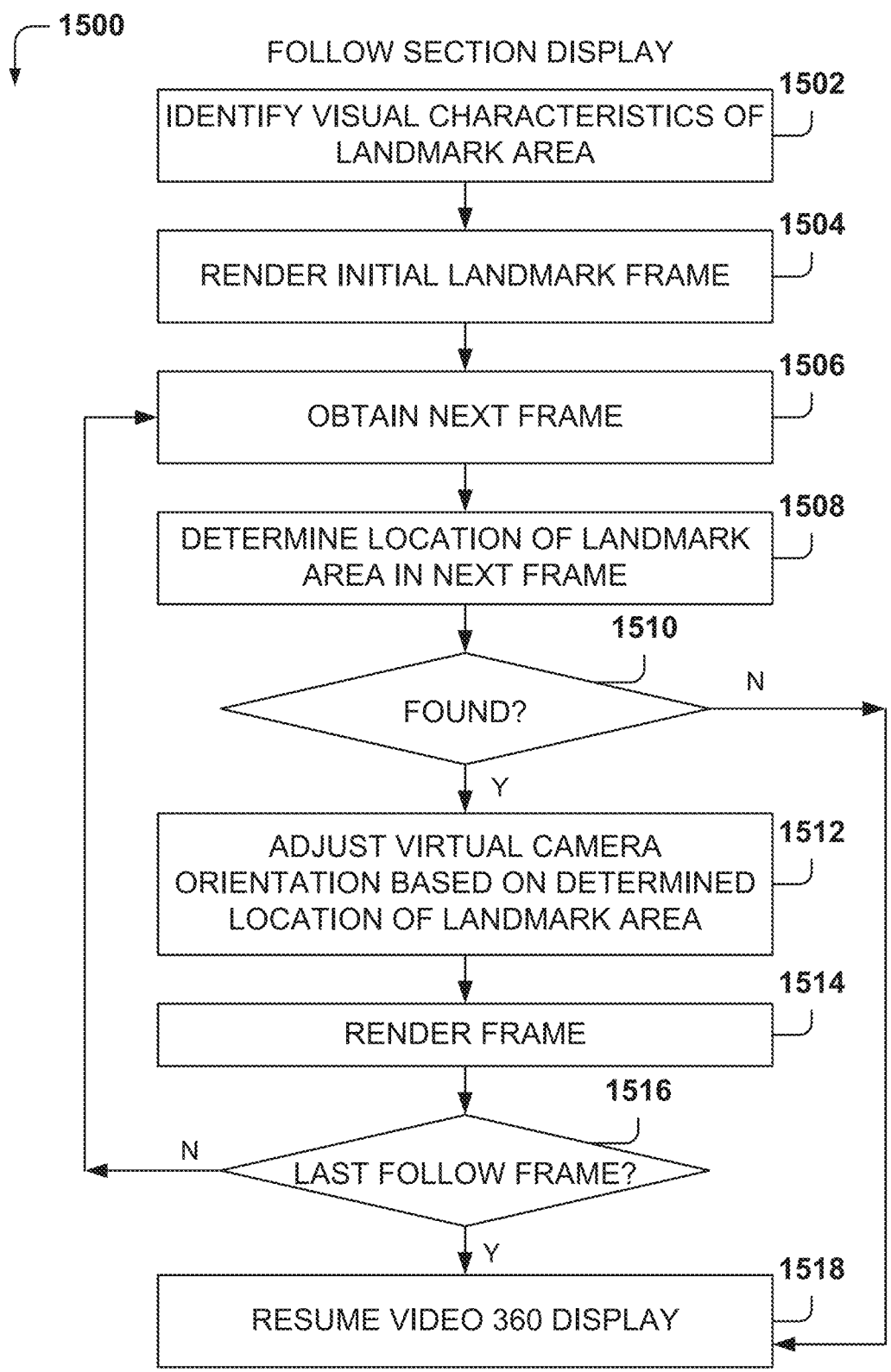
FIG. 15 is a flowchart of a method for generating a video that tracks a selected object, according to some example embodiments.

FIG. 15 is a flowchart of a method 1500 for generating a video that tracks a selected object, according to some example embodiments. While the various operations in this flowchart are presented and described sequentially, one of ordinary skill will appreciate that some or all of the operations may be executed in a different order, be combined or omitted, or be executed in parallel.

At operation 1502, the visual characteristics of the landmark area are identified. The landmark area is the area identified by the user for tracking. In some example embodiments, the user determines the landmark area by touching the touch screen on the desired location. The landmark area may be as small as a pixel or include an area encompassing a plurality of pixels. The visual characteristics are based on the RGB values of the pixels as well as any other geometric properties that may be detected, such as a line or group of lines, a circle, a group of pixels with certain color surrounded by pixels of a different color, etc. In addition, the location of the landmark area is utilized for tracking, as the landmark area is searched in a frame based on the location of the landmark area in the previous frame.

From operation 1502, the method flows to operation 1504 where the initial landmark frame is rendered on the display. At operation 1506, the next frame in the video stream is obtained. From operation 1506, the method flows to operation 1508 where the location of the landmark area is determined in the next frame based on a comparison of the visual characteristics of the pixels around the location of the landmark area in the previous frame.

At operation 1510, a check is made to determine if the landmark area has been found. If the landmark area has been found, the method flows to operation 1512, and if the landmark area is not found then the method flows to operation 1518.

At operation 1512, the orientation of the virtual camera is adjusted on the frame based on the determined location of the landmark area in order to substantially keep the orientation of the virtual camera towards the landmark. For example, if the landmark area is on the center of the display in the previous frame, the landmark area will be placed on the center of the display in the next frame, if possible. If the landmark area is situated on the top half of the frame, the landmark area will be situated in approximately the same location in the next frame, as in the example illustrated above with reference to FIG. 14. In some example embodiments, the landmark will be situated at the center of the frame, if possible. However, in other example embodiments, the goal is to keep the landmark area in the same location within the display in all the frames during the follow period.

At operation 1514, the frame is rendered on the display, and at operation 1516 a check is made to determine if the current frame was the last frame in the follow sequence of frames. If the frame is the last frame, the method flows to operation 1518, and if the frame is not the last frame, the method flows back to operation 1506.

At operation 1518, the display of the video for the virtual camera resumes. For example, if no other key frames are found, the orientation will not change unless the user manually changes the orientation. If other key frames are found, a transition will be created from the last frame in the follow period towards the following key frames.

Figure 16:
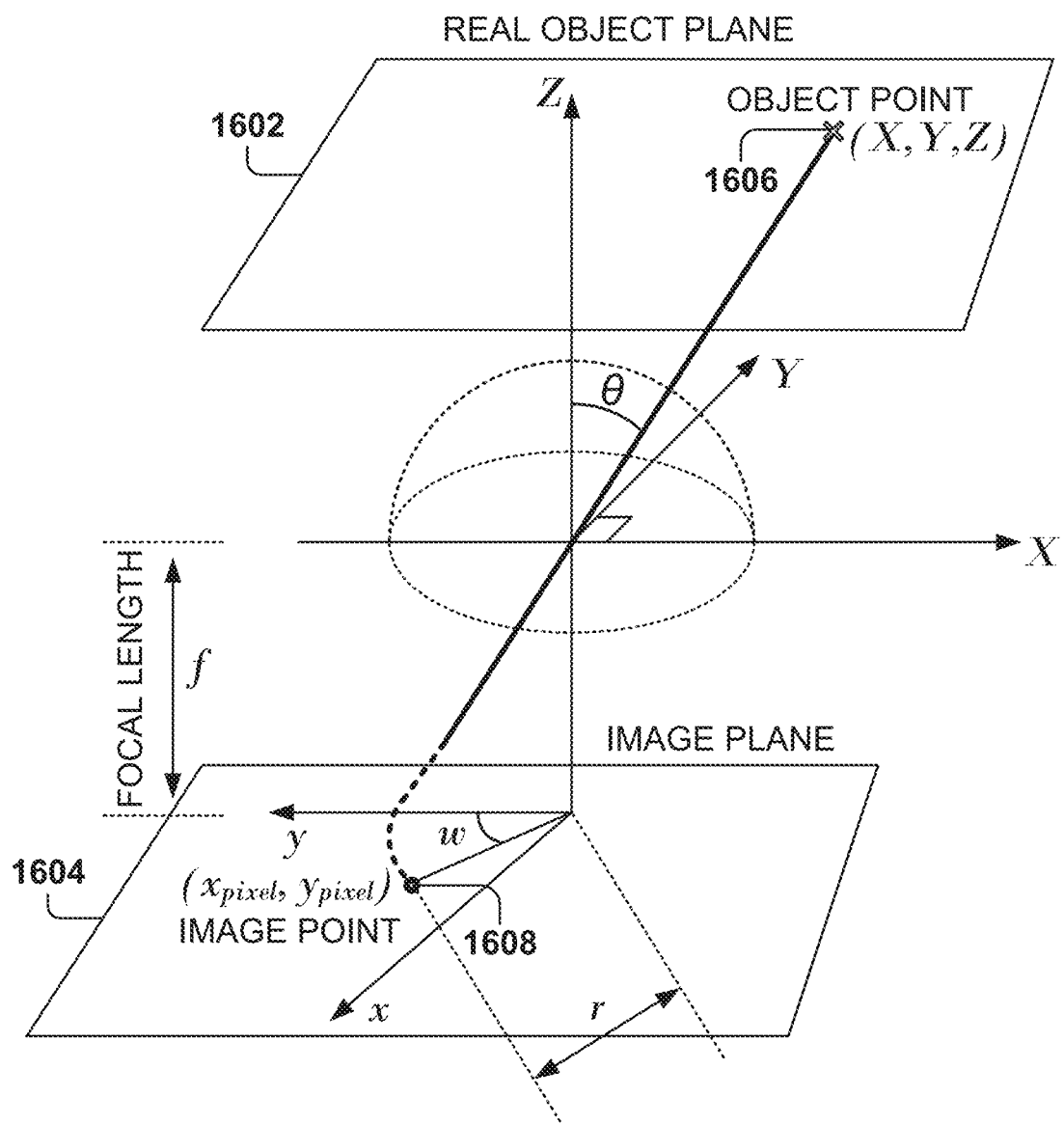
FIG. 16 illustrates the fisheye projection to generate a display view, according to some example embodiments.

FIG. 16 illustrates the fisheye projection to generate a display view, according to some example embodiments. The wide-angle lenses create a fisheye effect and a mapping function is used to correct the lens data in order to make the view of the virtual camera look natural.

Each pixel comes from a ray that hits a location in the sphere captured by the 360-degree camera 102. The distance of a point from the image center r, in the projection, is dependent on the focal length of the optical system f, and the angle from the optical axis θ, where θ is expressed in radians.

A point in space is defined by three coordinates (X, Y, Z), where Z corresponds to the depth in the viewing field. A line from the origin (0, 0, 0) to the point (X, Y, Z) has an angle θ with the Z axis, that corresponds to the orientation of the lens towards the field of view.

The real object point is on a real object plane 1602, and when the real object point is projected into an image plane 1604, the distance r from the origin in the image plane to the point is modified based on the mapping function, which defines r. The result is the image point with coordinates $(x_{pixel}, y_{pixel})$. Since r is modified by the mapping function, the fisheye effect may be increased or decreased.

There are multiple mapping functions, also referred to as projection functions, that may be used to correct the fisheye effect. The linear or equidistant mapping function maintains the angular distances and follows the equation:

$$r = f\theta$$

The Gnomonical or Rectilinear mapping works like a pinhole camera, where straight lines remain straight (distortion free) when θ is smaller than 90°. The Gnomonical mapping function utilizes the equation:

$$r = f \cdot \tan(\theta)$$

Other mapping functions include the stereographic mapping function ($r=2f \cdot \tan(\theta/2)$), the equisolid angle mapping function ($r=2f \cdot \sin(\theta/2)$), and the orthographic mapping function ($r=f \cdot \sin(\theta)$).

Figure 17A:
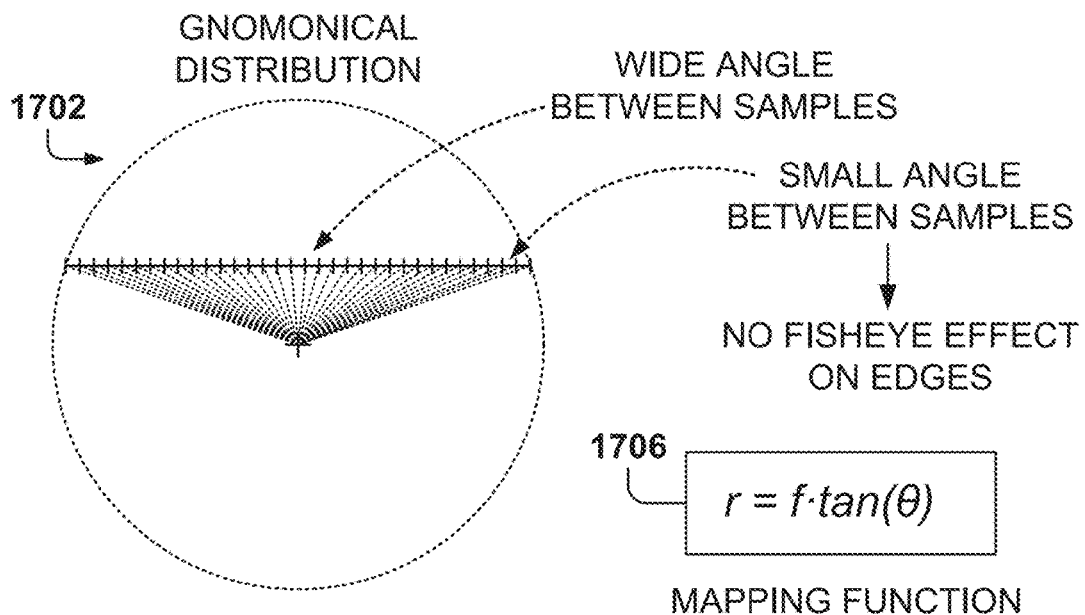
FIG. 17A illustrates the correction for the fisheye effect when using a Gnomonical mapping function, according to some example embodiments.

FIG. 17A illustrates the correction for the fisheye effect when using a Gnomonical mapping function, according to some example embodiments. In one embodiment, the gnomonical distribution mapping function 1706 is used. Chart 1702 illustrates how the rays coming from the center of the sphere are distributed. The result is the elimination of fisheye effect on the eyes.

The projection may be described as a sphere that includes a ray for all the points, in all the directions that the light comes in. A traditional camera creates a plane and assembles the image on that plane. However, if the lens angle becomes very wide, there are a lot of pixels on the edges with very similar directions, causing the stretched-out or blurred image.

However, the distribution of the rays shows how the rays are farther apart in the center and closer together at the edges. The result may be the appearance of long stretch of lines or blurred areas around the edges because the sampling of many pixels is done in the same area. These is why other cameras on the market show warping and blurriness on the edges, and this is why many people say that 360 videos look strange or unnatural.

In some example embodiments, model view projection matrices are utilized. To draw a model on the screen, there are typically three different transformations that need to be done, and there are three different matrices that correspond to these three transformations. The standard transformation path is from 3D points in the model space using a world matrix, to 3D points in the world space using a view matrix, to 3D points in view space using a projection matrix.

The process starts with the vertices in model space. The coordinates of the vertices represent where they are in relationship with the rest of the model. At this point, the world matrix it is applied. This transforms the model space coordinates into world space coordinates. World space coordinates represent where the vertices (and the entire model) are in relationship to the whole world. The world matrix basically indicates where the model is located in the world.

The next operation is to take the world space coordinates and apply another transformation to them, the view matrix. The view matrix places the coordinates into the view space, which is where the vertices are in relationship to the viewer. That is, where the virtual camera is located.

The third operation is to apply the projection matrix. The projection matrix correlates to the type of camera being used and it provides the information needed to determine where on the screen each of our vertices should appear. This transformation essentially gets the vertices into screen coordinates.

Figure 17B:
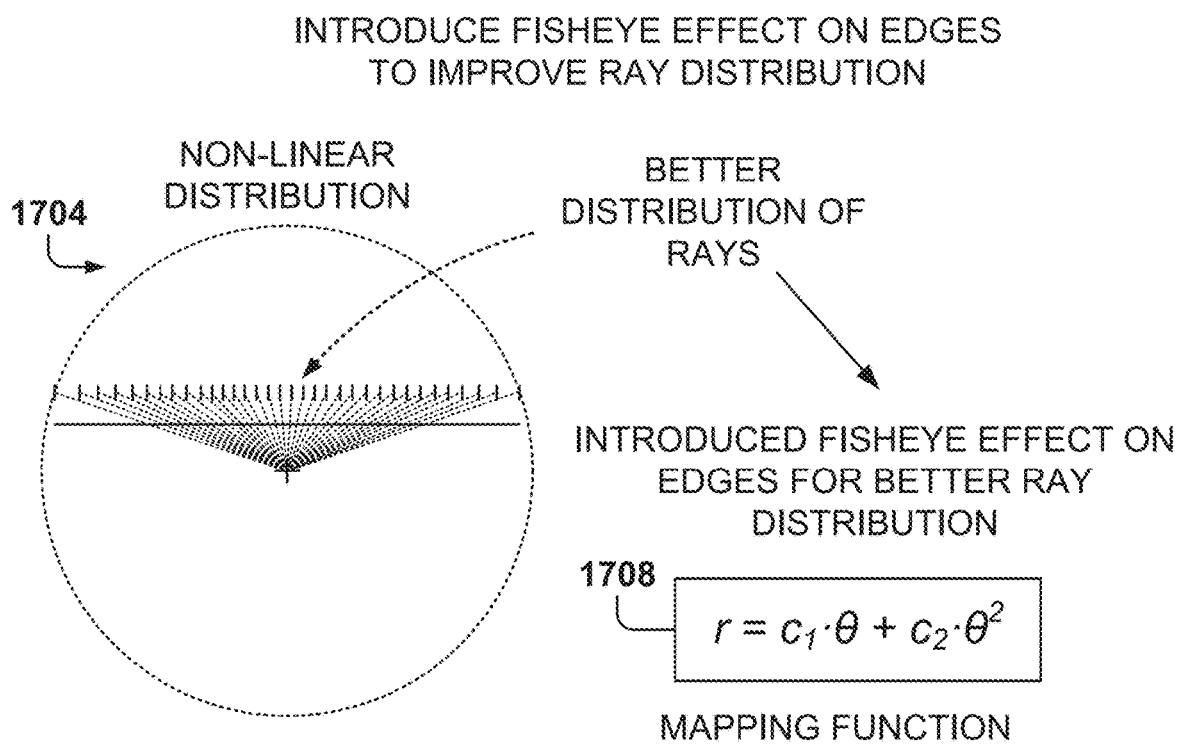
FIG. 17B illustrates the introduction of some fisheye effect to reduce distortion by utilizing a mapping function that spaces the distribution of samples along the edges of the camera view, according to some example embodiments.

FIG. 17B illustrates the introduction of some fisheye effect to reduce distortion by utilizing a mapping function that spaces the distribution of samples along the edges of the camera view, according to some example embodiments.

In some example embodiments, some fisheye effect is introduced on the edges to improve the ray distribution and eliminate the blurry lines on the edges of the lens view. The fisheye effect introduced around the edges is not strong so the images appear natural. This avoids having unnaturally stretched images.

This model provides a more uniform distribution of θ, which may curve the image slightly, but providing an overall natural view because it does not stretch points situated towards the edge. In a sense, some fisheye effect is added effectively to improve the vision around the edges of the lens view.

In some example embodiments, the mapping function 1708 is:

$$r = c_1 \cdot \theta + c_2 \cdot \theta^2$$

The angle θ, expressed in radians, may be calculated as follows:

$$\theta = a\cos(\text{ray.normalized}().z())$$

Where ray is a vector [x, y, f] normalized in the range [−0.5, 0.5], [x,y] are the pixel offsets from the image center, also referred to as ($x_{pixel}$, $y_{pixel}$) as illustrated in FIG. 16, and f is the focal length parameter.

The parameters $c_1$ and $c_2$ are used to control the fisheye effect along the field of view. When $c_2$ is zero, the function is simply $c_1 \cdot \theta$, a linear mapping function. However, this linear mapping function may divide the field of view uniformly and lacks control of the fisheye effect around the edges.

The advantage of having the term $c_2 \cdot \theta^2$ is that it provides a better control of the fisheye effect on the edges. When θ is close to zero, $c_2 \cdot \theta^2$ is also close to zero, so the effect of $c_2$ is small on the center. However, as θ grows the term $c_2 \cdot \theta^2$ grows, growing faster than $c_1 \cdot \theta$, and its impact is stronger on the edges. Thus, $c_2$ may be used to control fisheye effect on the edges.

In some example embodiments, the term $c_1 \cdot \theta$ is used to eliminate the fisheye effect of the lens, and the term $c_2 \cdot \theta^2$ is used to introduce a slight fisheye effect around the edges.

The same principle may be expanded further with the equation:

$$r = c_1 \cdot \theta + c_2 \cdot \theta^2 + c_3 \cdot \theta^3$$

In this case, $c_3$ may also be used to increase the fisheye effect on the edges. Further, other polynomials of larger grade may also be used.

The determination of the parameters $c_i$ may be performed with a small amount of experimentation. Since the $c_i$ parameters depend on the focal length f, and f may vary from lens to lens, the $c_i$ parameters may vary from lens to lens. In one example embodiment, $c_1=1.3$, $c_2=0.1$, and $f=1.374$, but other values are also possible. It is noted that the parameters $c_i$ may be positive, negative, or zero. In some example embodiments, $c_1$ and $c_2$ may be in the range between −100 and 100, and in other embodiments in the range between −1 million and 1 million.

When c2 is zero, the linear mapping function is utilized. In one embodiment, $c_1=1.6$, $c_2=0$, and $f=1.374$, but other embodiments may utilize different values based on the lens characteristics. In another embodiment, $c_1=1.05$, $c_2=0$, and $f=1.374$.

Further, in other embodiments the ray may not be normalized to the range [−0.5, 0.5] and other $c_i$ values may be used.

Figure 18:
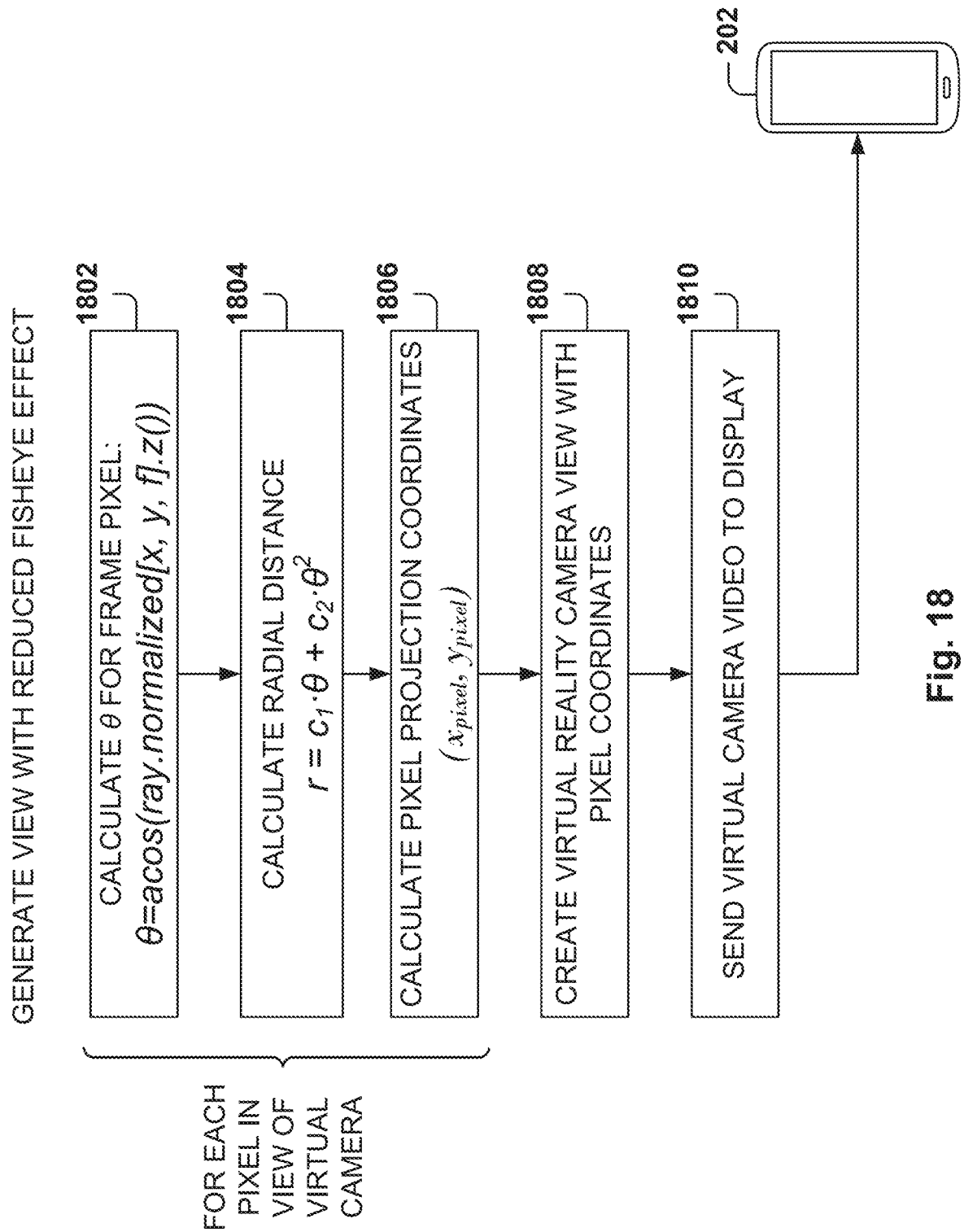
FIG. 18 is a flowchart of a method for controlling the fisheye effect, according to some example embodiments.

FIG. 18 is a flowchart of a method for controlling the fisheye effect, according to some example embodiments. While the various operations in this flowchart are presented and described sequentially, one of ordinary skill will appreciate that sonic or all of the operations may be executed in a different order, be combined or omitted, or be executed in parallel.

Operations 1802, 1804, and 1806 are performed for each pixel in view of the virtual camera. At operation 1802, θ is calculated with the equation θ=a cos(ray.normalized( ).z( )). From operation 1802, the method flows to operation 1804 where the radial distance r is calculated with the equation $r=c_1 \cdot \theta + c_2 \cdot \theta$.

In operation 1806, the pixel coordinates ($x_{pixel}$, $y_{pixel}$) for the image plane projection are calculated. From operation 1806, the method flows to operation 1808, where the virtual reality camera view is created with the calculated pixel coordinates, based on the calculated r and θ.

From operation 1808, the method flows to operation 1810, where the virtual camera video is sent to the display of the mobile device 202.

Figure 19:
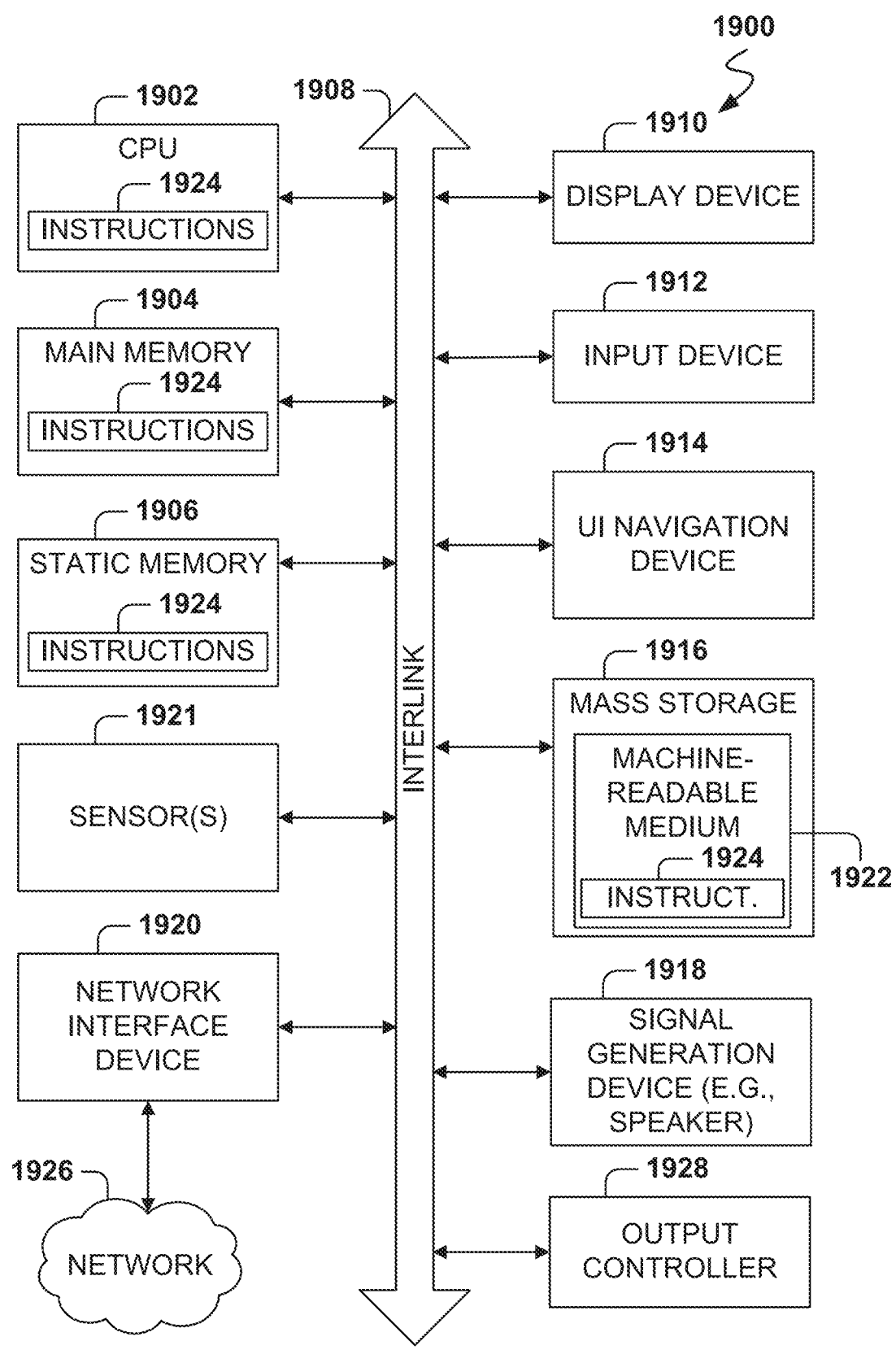
FIG. 19 is a block diagram illustrating an example of a machine upon which one or more example embodiments may be implemented.

FIG. 19 is a block diagram illustrating an example of a machine 1900 upon which one or more example embodiments may be implemented. In alternative embodiments, the machine 1900 may operate as a standalone device or may be connected (e.g., networked) to other machines. In a networked deployment, the machine 1900 may operate in the capacity of a server machine, a client machine, or both in server-client network environments. In an example, the machine 1900 may act as a peer machine in peer-to-peer (P2P) (or other distributed) network environment. The machine 1900 may be a personal computer (PC), a tablet PC, a set-top box (STB), a laptop, a mobile telephone, a web appliance, a network router, switch or bridge, or any machine capable of executing instructions (sequential or otherwise) that specify actions to be taken by that machine. Further, while only a single machine 1900 is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic or a number of components or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1900 may include a Central Processing Unit (CPU) 1902, a main memory 1904, and a static memory 1906, some or all of which may communicate with each other via an interlink (e.g., bus) 1908. The machine 1900 may further include a display device 1910, one or more input devices 1912 (e.g., a keyboard, a microphone, a touchscreen, a game controller, a remote control, a camera, dedicated buttons), and one or more user interface navigation devices 1914 (e.g., a mouse, a touchpad, a touchscreen, a joystick, a gaze tracker). In an example, the display device 1910, input devices 1912, and user interface navigation devices 1914 may include a touchscreen display. The machine 1900 may additionally include a mass storage device (e.g., drive unit) 1916, a signal generation device 1918 (e.g., a speaker), a network interface device 1920, and one or more sensors 1921, such as a Global Positioning System (GPS) sensor, compass, accelerometer, magnetometer, or other sensors. The machine 1900 may include an output controller 1928, such as a serial (e.g., universal serial bus (USB), parallel., or other wired or wireless (e.g., infrared (IR), near field communication (NFC), etc.) connection to communicate or control one or more peripheral devices (e.g., a printer, a card reader, etc.).

The mass storage device 1916 may include a machine-readable medium 1922 on which is stored one or more sets of data structures or instructions 1924 (e.g., software) embodying or utilized by any one or more of the techniques or functions described herein. The instructions 1924 may also reside, completely or at least partially, within the main memory 1904, within the static memory 1906, or within the CPU 1902 during execution thereof by the machine 1900. In an example, one or any combination of the CPU 1902, the main memory 1904, the static memory 1906, or the mass storage device 1916 may constitute machine-readable media.

While the machine-readable medium 1922 is illustrated as a single medium, the term "machine-readable medium" may include a single medium or multiple media (e.g., a centralized or distributed database, and/or associated caches and servers) configured to store the one or more instructions 1924.

The term "machine-readable medium" may include any medium that is capable of storing, encoding, or carrying instructions 1924 for execution by the machine 1900 and that causes the machine 1900 to perform any one or more of the techniques of the present disclosure, or that is capable of storing, encoding or carrying data structures used by or associated with such instructions 1924. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1924 may further be transmitted or received over a communications network 1926 using a transmission medium via the network interface device 1920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, wireless data networks (e.g., Institute of Electrical and Electronics Engineers (IEEE) 1902.11 family of standards known as Wi-Fi®, IEEE 1902.16 family of standards known as WiMax®), IEEE 1902.15.4 family of standards, peer-to-peer (P2P) networks, among others. In an example, the network interface device 1920 may include one or more physical jacks (e.g., Ethernet, coaxial, or phone jacks) or one or more antennas to connect to the communications network 1926. In an example, the network interface device 1920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 1924 for execution by the machine 1900, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    receiving a selection in a graphical user interface (GUI) presented in a display, the selection being for playback of a 360-degree video captured by a 360-degree camera, the 360-degree video comprising video data captured by a first lens and a second lens in the 360-degree camera, the video data from each lens including pixels with three-dimensional (3D) coordinates and a color value;
    presenting, in the GUI in the display, a projection of the 360-degree video based on a viewing angle of the 360-degree video;
    for each frame in the projection, determining, by one or more processors, first video data from the first lens and second video data from the second lens associated with the projection;
    adjusting, by the one or more processors, a fisheye effect of the first video data and the second video data in the projection to improve a distribution of sampling rays from the first lens and the second lens, the adjusting of the fisheye effect for each pixel in the viewing angle comprising:
        calculating an angle $\theta$ of the pixel from an optical axis, wherein $\theta$ is based on a focal length of the first lens or the second lens; and
        calculating a distance r, from a center of the projection to the pixel, with a mapping function that is a function of the angle $\theta$, wherein the mapping function is $r = c_1 \cdot \theta + c_2 \cdot \theta^2$, wherein $c_1$ and $c_2$ are tunable parameters for controlling the fisheye effect along a field of view, wherein $c_1$ and $c_2$ are tunable parameters for each camera for controlling the fisheye effect, wherein a first $c_1 \cdot \theta$ is utilized to control the fisheye effect of the first lens and a second $c_1 \cdot \theta$ is utilized to control the fisheye effect of the second lens, wherein a first $c_2 \cdot \theta^2$ is utilized to introduce fisheye effect around edges of view of the first lens and a second $c_2 \cdot \theta^2$ is utilized to introduce fisheye effect around edges of view of the second lens; and
    presenting the projection in the GUI in the display after adjusting the fisheye effect.

2. The method as recited in claim 1, wherein determining the first video data associated with the projection further comprises:
    identifying a first viewing angle from the first lens based on the viewing angle of the 360-degree video; and
    determining pixels captured with the first lens that correspond to the first viewing angle for creating the projection.

3. The method as recited in claim 1, wherein each lens has a respective transformation function to convert pixels in the frame to pixels in the projection, each transformation function being based on a focal length of each lens and unique characteristics of each lens.

4. The method as recited in claim 1, wherein determining the first video data and the second video data further comprises:
    for each pixel in the projection, determining if the pixel is present in the first video data, in the second video data, or in both the first video data and the second video data.

5. The method as recited in claim 4, wherein a common pixel is present in the first video data and the second video data, the method further comprising:
    blending, for the common pixel, the first video data and the second video data to obtain a color of the common pixel in the projection.

6. The method as recited in claim 5, wherein blending further comprises:
blending color values of the common pixel and pixels near the common pixel to obtain the color of the common pixel in the projection.

7. The method as recited in claim 1, wherein the first lens and the second lens are wide-angle lenses with a viewing angle greater than or equal to 180 degrees.

8. A system comprising:
a touchscreen;
a memory comprising instructions; and
one or more computer processors, wherein the instructions, when executed by the one or more computer processors, cause the one or more computer processors to perform operations comprising:
receiving a selection in a graphical user interface (GUI) presented in the touchscreen, the selection being for playback of a 360-degree video captured by a 360-degree camera, the 360-degree video comprising video data captured by a first lens and a second lens in the 360-degree camera, the video data from each lens including pixels with three-dimensional (3D) coordinates and a color value;
presenting, in the GUI in the touchscreen, a projection of the 360-degree video based on a viewing angle of the 360-degree video;
for each frame in the projection, determining first video data from the first lens and second video data from the second lens associated with the projection;
adjusting a fisheye effect of the first video data and the second video data in the projection to improve a distribution of sampling rays from the first lens and the second lens, the adjusting of the fisheye effect for each pixel in the viewing angle comprising:
calculating an angle $\theta$ of the pixel from an optical axis, wherein $\theta$ is based on a focal length of the first lens or the second lens; and
calculating a distance r, from a center of the projection to the pixel, with a mapping function that is a function of the angle $\theta$, wherein the mapping function is $r = c_1 \cdot \theta + c_2 \cdot \theta^2$, wherein $c_1$ and $c_2$ are tunable parameters for controlling the fisheye effect along a field of view, wherein $c_1$ and $c_2$ are tunable parameters for each camera for controlling the fisheye effect, wherein a first $c_1 \cdot \theta$ is utilized to control the fisheye effect of the first lens and a second $c_1 \cdot \theta$ is utilized to control the fisheye effect of the second lens, wherein a first $c_2 \cdot \theta^2$ is utilized to introduce fisheye effect around edges of view of the first lens and a second $c_2 \cdot \theta^2$ is utilized to introduce fisheye effect around edges of view of the second lens; and
presenting the projection in the GUI in the touchscreen after adjusting the fisheye effect.

9. The system as recited in claim 8, wherein determining the first video data associated with the projection further comprises:
identifying a first viewing angle from the first lens based on the viewing angle of the 360-degree video; and
determining pixels captured with the first lens that correspond to the first viewing angle for creating the projection.

10. A non-transitory machine-readable storage medium including instructions that, when executed by a machine, cause the machine to perform operations comprising:
receiving a selection in a graphical user interface (GUI) presented in a display, the selection being for playback of a 360-degree video captured by a 360-degree camera, the 360-degree video comprising video data captured by a first lens and a second lens in the 360-degree camera, the video data from each lens including pixels with three-dimensional (3D) coordinates and a color value;
presenting, in the GUI in the display, a projection of the 360-degree video based on a viewing angle of the 360-degree video;
for each frame in the projection, determining first video data from the first lens and second video data from the second lens associated with the projection;
adjusting a fisheye effect of the first video data and the second video data in the projection to improve a distribution of sampling rays from the first lens and the second lens, the adjusting of the fisheye effect for each pixel in the viewing angle comprising:
calculating an angle $\theta$ of the pixel from an optical axis, wherein $\theta$ is based on a focal length of the first lens or the second lens; and
calculating a distance r, from a center of the projection to the pixel, with a mapping function that is a function of the angle $\theta$, wherein the mapping function is $r = c_1 \cdot \theta + c_2 \cdot \theta^2$, wherein $c_1$ and $c_2$ are tunable parameters for controlling the fisheye effect along a field of view, wherein $c_1$ and $c_2$ are tunable parameters for each camera for controlling the fisheye effect, wherein a first $c_1 \cdot \theta$ is utilized to control the fisheye effect of the first lens and a second $c_1 \cdot \theta$ is utilized to control the fisheye effect of the second lens, wherein a first $c_2 \cdot \theta^2$ is utilized to introduce fisheye effect around edges of view of the first lens and a second $c_2 \cdot \theta^2$ is utilized to introduce fisheye effect around edges of view of the second lens; and
presenting the projection in the GUI in the display after adjusting the fisheye effect.

11. The machine-readable storage medium as recited in claim 10, wherein determining the first video data associated with the projection further comprises:
identifying a first viewing angle from the first lens based on the viewing angle of the 360-degree video; and
determining pixels captured with the first lens that correspond to the first viewing angle for creating the projection.

* * * * *